(12) United States Patent
Rao

(10) Patent No.: US 11,131,761 B2
(45) Date of Patent: *Sep. 28, 2021

(54) ANTENNA CONFIGURATION FOR PARKING ASSIST RADAR

(71) Applicant: TEXAS INSTRUMENTS INCORPORATED, Dallas, TX (US)

(72) Inventor: Sandeep Rao, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/897,309

(22) Filed: Jun. 10, 2020

(65) Prior Publication Data

US 2020/0301000 A1    Sep. 24, 2020

Related U.S. Application Data

(63) Continuation of application No. 15/661,891, filed on Jul. 27, 2017, now Pat. No. 10,725,162, which is a
(Continued)

(30) Foreign Application Priority Data

Apr. 4, 2014    (IN) .......................... 1801/CHE/2014

(51) Int. Cl.
*G01S 13/06*    (2006.01)
*G01S 7/35*    (2006.01)
(Continued)

(52) U.S. Cl.
CPC .............. *G01S 13/06* (2013.01); *G01S 7/354* (2013.01); *G01S 13/42* (2013.01); *G01S 13/931* (2013.01);
(Continued)

(58) Field of Classification Search
CPC ................... G01S 13/42; G01S 13/931; G01S 2013/93275; G01S 2013/93271;
(Continued)

(56) References Cited

U.S. PATENT DOCUMENTS 2,630,563 A * 3/1953 Haworth ................... G01S 7/20
                                                            342/142
3,212,088 A * 10/1965 Alexander .............. G01S 7/295
                                                            342/149
(Continued)

FOREIGN PATENT DOCUMENTS

CN    101218751    7/2008
CN    101490578    12/2009
(Continued)

OTHER PUBLICATIONS

International Search Report and Written Opinion for PCT/US2015/024555 dated Jul. 16, 2015.
(Continued)

*Primary Examiner* — Bernarr E Gregory
*Assistant Examiner* — Nuzhat Pervin
(74) *Attorney, Agent, or Firm* — John R. Pessetto; Charles A. Brill; Frank D. Cimino

(57) ABSTRACT

A method of estimating position of an obstacle of a plurality of obstacles with a radar apparatus. An azimuth frequency, an elevation frequency and a range of the obstacle are estimated to generate an estimated azimuth frequency, an estimated elevation frequency and an estimated range of the obstacle. A metric is estimated from one or more of the estimated azimuth frequency, the estimated elevation frequency and the estimated range of the obstacle. The metric is compared to a threshold to detect an error in at least one of the estimated azimuth frequency and the estimated elevation frequency. On error detection, a sign of at least one of
(Continued)

Figure 1A:
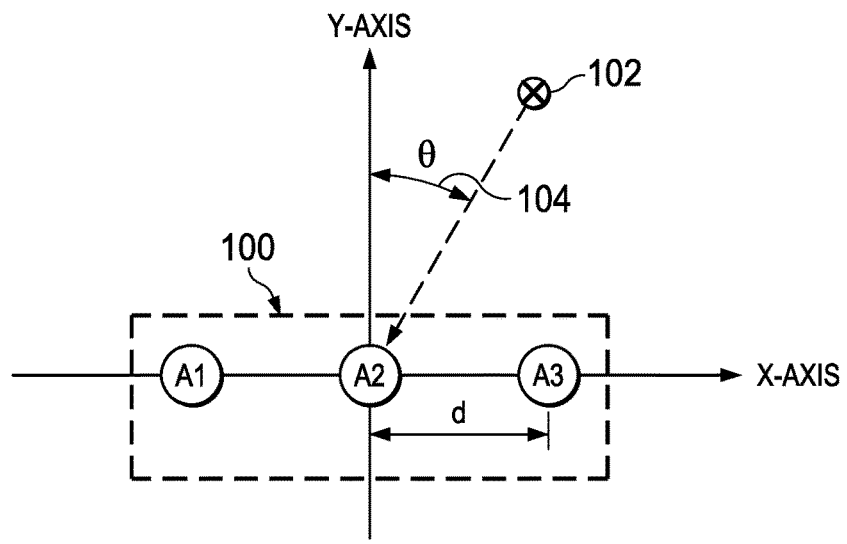

the estimated azimuth frequency and the estimated elevation frequency is inverted to generate a true estimated azimuth frequency and a true estimated elevation frequency respectively.

23 Claims, 11 Drawing Sheets

Related U.S. Application Data continuation of application No. 14/319,293, filed on Jun. 30, 2014, now abandoned.

(51) Int. Cl.
G01S 13/42 (2006.01)
G01S 13/931 (2020.01)
H01Q 3/26 (2006.01)
H01Q 25/00 (2006.01)

(52) U.S. Cl.
CPC .......... *H01Q 3/2629* (2013.01); *H01Q 25/00* (2013.01); *G01S 7/356* (2021.05); *G01S 2013/9314* (2013.01); *G01S 2013/93271* (2020.01); *G01S 2013/93272* (2020.01); *G01S 2013/93275* (2020.01)

(58) Field of Classification Search
CPC ..... G01S 2013/93272; G01S 2007/356; G01S 13/06; G01S 7/354; G01S 2013/9314; H01Q 25/00; H01Q 3/2629
See application file for complete search history.

(56) References Cited

U.S. PATENT DOCUMENTS

| | | | | | |
|---|---|---|---|---|---|
| 3,218,639 | A * | 11/1965 | Mercer | ................... | G01S 13/66 342/90 |
| 3,362,024 | A * | 1/1968 | Badewitz | ............... | G01S 13/60 342/63 |
| 3,369,231 | A * | 2/1968 | Foral | ..................... | G01S 13/935 342/29 |
| 3,490,018 | A * | 1/1970 | Botwin | ............... | G01S 13/4454 342/94 |
| 3,530,465 | A * | 9/1970 | Zupanick | ............ | G05D 1/0646 342/65 |
| 4,700,716 | A * | 10/1987 | Kasevich | ............... | A61B 18/18 607/156 |
| 5,311,183 | A * | 5/1994 | Mathews | ............. | G01S 13/953 342/26 B |
| 5,831,570 | A * | 11/1998 | Ammar | ................. | F41G 7/2286 342/26 B |
| 5,945,926 | A * | 8/1999 | Ammar | ................. | F41G 7/2246 340/970 |
| 5,999,121 | A * | 12/1999 | Salonen | .................. | G01W 1/00 324/640 |
| 6,011,505 | A * | 1/2000 | Poehler | .............. | G01S 13/9019 342/25 C |
| 6,181,270 | B1 * | 1/2001 | Dwyer | .................. | G01S 13/904 342/25 R |
| 6,255,991 | B1 * | 7/2001 | Hedin | ....................... | G01S 3/48 342/424 |
| 6,275,180 | B1 | 8/2001 | Dean et al. | | |
| 6,424,287 | B1 * | 7/2002 | Doerry | ................ | G01S 13/9023 342/25 R |
| 6,801,156 | B1 * | 10/2004 | Wasiewicz | ............. | G01S 13/44 342/95 |
| 7,227,493 | B2 * | 6/2007 | Oswald | ................... | G01S 13/46 342/70 |
| 7,479,920 | B2 * | 1/2009 | Niv | ......................... | G01S 13/50 342/65 |
| 7,623,061 | B2 * | 11/2009 | Spyropulos | ............. | G01S 7/412 342/170 |
| 7,633,429 | B1 * | 12/2009 | Liu | ....................... | G01S 13/935 342/33 |
| 7,714,782 | B2 * | 5/2010 | Davis | ........................ | G01S 3/74 342/377 |
| 7,773,665 | B2 | 8/2010 | Eum et al. | | |
| 7,859,449 | B1 * | 12/2010 | Woodell | ................ | G01S 13/953 342/65 |
| 7,965,225 | B1 * | 6/2011 | Dickerson | ............ | G01S 13/953 342/73 |
| 8,064,550 | B2 * | 11/2011 | Chrabieh | ............ | H04L 27/3863 375/343 |
| 8,077,076 | B2 | 12/2011 | Walter et al. | | |
| 8,483,607 | B2 | 7/2013 | Kawasaki | | |
| 8,515,600 | B1 * | 8/2013 | McCusker | ............. | G01C 5/005 701/9 |
| 8,570,211 | B1 * | 10/2013 | Piesinger | ................ | G01S 13/48 342/29 |
| 8,922,423 | B2 * | 12/2014 | Takashima | ............... | H01Q 3/04 342/146 |
| 9,024,805 | B1 * | 5/2015 | Jinkins | .................. | G01S 5/0247 342/120 |
| 9,341,706 | B2 * | 5/2016 | Ward | ..................... | G01S 7/412 |
| 10,725,162 | B2 * | 7/2020 | Rao | ...................... | H01Q 3/2629 |
| 2004/0178943 | A1 * | 9/2004 | Niv | ........................ | G01S 13/50 342/29 |
| 2005/0088642 | A1 * | 4/2005 | Singh | .................... | G01S 7/4811 356/5.01 |
| 2008/0111733 | A1 * | 5/2008 | Spyropulos | ............. | G01S 7/412 342/189 |
| 2009/0015462 | A1 * | 1/2009 | Nakanishi | .............. | G08G 1/167 342/107 |
| 2009/0021421 | A1 * | 1/2009 | Wakayama | ............. | G01S 7/354 342/175 |
| 2010/0231455 | A1 * | 9/2010 | Frieaizen | .................. | G01S 3/74 342/445 |
| 2011/0140952 | A1 * | 6/2011 | Kemkemian | ......... | G01S 13/426 342/146 |
| 2012/0068882 | A1 * | 3/2012 | Blachford | ............... | G01S 13/48 342/104 |
| 2012/0281503 | A1 * | 11/2012 | Rikoski | .................... | G01S 15/89 367/88 |
| 2012/0281504 | A1 * | 11/2012 | Rikoski | ................ | G01C 21/005 367/88 |
| 2012/0308239 | A1 * | 12/2012 | Sheth | ................. | H04B 10/1125 398/131 |
| 2013/0182790 | A1 * | 7/2013 | Jalali | ..................... | H01Q 21/064 375/285 |
| 2014/0038528 | A1 * | 2/2014 | Harvey | ................. | H04B 17/0085 455/67.14 |
| 2015/0188237 | A1 * | 7/2015 | Apostolos | ............... | H01Q 21/08 343/824 |
| 2016/0054442 | A1 * | 2/2016 | Li | ........................... | G01S 13/87 342/27 |
| 2016/0285611 | A1 * | 9/2016 | Fischer | ................. | H04W 16/14 |
| 2019/0146052 | A1 * | 5/2019 | Chiu | ........................ | G01S 3/60 342/146 |

FOREIGN PATENT DOCUMENTS

| | | |
|---|---|---|
| CN | 101604016 | 12/2009 |
| EP | 2113788 | 4/2009 |
| RU | 2419813 | 5/2011 |

OTHER PUBLICATIONS

Chinese Search Report in corresponding Chinese Patent Application No. CN2015800188901, dated Aug. 2, 2018 (2 pages).

* cited by examiner

ANTENNA CONFIGURATION FOR PARKING ASSIST RADAR

CROSS REFERENCE TO RELATED APPLICATIONS

This continuation application claims priority to U.S. patent application Ser. No. 15/661,891, filed Jul. 27, 2017, which claims priority to U.S. patent application Ser. No. 14/319,293, filed Jun. 30, 2014 (now abandoned), which claims priority to India provisional patent application No. 1801/CHE/2014 filed Apr. 4, 2014, all of which are hereby incorporated by reference in their entirety.

TECHNICAL FIELD

Embodiments of the disclosure relate generally to communication antennas and more particularly to an antenna unit in radars that assists in vehicle parking.

BACKGROUND

A vehicle has parking sensors to detect an obstacle behind the vehicle. The parking sensors determine a distance of the vehicle from the obstacle using ultrasonic signals when backing a vehicle. The parking sensor operates at ultrasonic frequencies. The parking sensor outputs an ultrasonic detecting signal to detect whether any obstacle is behind the rear of the vehicle and receives an ultrasonic signal as reply from the obstacle. A vehicle generally requires multiple parking sensors to cover the entire rear of the vehicle which makes it a cost intensive solution. Also, the ultrasonic parking sensors use a time division obstacle detecting method in which each sensor sends and receives ultrasonic detect signal in a defined time slot. Thus, the process of detecting obstacles using ultrasonic sensors is time consuming which is unsafe in vehicles moving with high velocity.

Ultrasonic parking sensors require the measurement and drilling of holes in the vehicle's bumper to install transducers. There are risks associated with drilling and mounting the transducers into the bumper. The performance of the Ultrasonic sensors is sensitive to temperature and atmospheric conditions such as snow and rain. The performance of ultrasonic sensors is severely degraded when the sensors are covered with snow. In addition, the range over which the ultrasonic sensors operates is limited.

The use of radars in automotive applications is evolving rapidly. Radars do not have the drawbacks discussed above in the context of ultrasonic sensors. Radar finds use in number of applications associated with a vehicle such as collision warning, blind spot warning, lane change assist, parking assist and rear collision warning. Pulse radar and FMCW (Frequency Modulation Continuous Wave) radar are predominantly used in such applications. In the pulse radar, a signal in the shape of a pulse is transmitted from the radar at fixed intervals. The transmitted pulse is scattered by the obstacle. The scattered pulse is received by the radar and the time between the transmission of the pulse and receiving the scattered pulse is proportional to a distance of the radar from the target. For better resolution, a narrower pulse is used which requires a high sampling rate in an ADC (analog to digital converter) used in the pulse radar. In addition, sensitivity of a pulse radar is directly proportional to the power which complicates the design process of the pulse radar.

In an FMCW radar, a transmit signal is frequency modulated to generate a transmit chirp. An obstacle scatters the transmit chirp. The scattered chirp is received by the FMCW radar. A signal obtained by mixing the transmitted chirp and the received scattered chirp is termed as a beat signal. The frequency of the beat signal is proportional to the distance of the obstacle from the FMCW radar. The beat signal is sampled by an analog to digital converter (ADC). A sampling rate of the ADC is proportional to the maximum frequency of the beat signal and the maximum frequency of the beat signal is proportional to the range of the farthest obstacle which can be detected by the FMCW radar. Thus, unlike in the pulse radar, the sampling rate of the ADC in the FMCW radar is independent of the range resolution, typically in the FMCW radar; multiple chirps are transmitted in a unit called as frame. A 2-dimensional (2D) FFT is performed on the sampled beat signal data received over a frame for range and relative velocity estimation of the obstacle. A bin is a 2D FFT grid that corresponds to a range and relative velocity estimate of an obstacle. A signal detected in a specific bin represents the presence of an obstacle with a predefined range and relative velocity. When multiple receive antennas are used to receive the scattered chirp, the FMCW radar estimates an elevation angle of the obstacle and an azimuth angle of the obstacle. In each frame, a 2D FFT is computed using the data received from each receive antenna. Thus, the number of 2D FFT's is equal to the number of the receive antennas. When an obstacle is detected in a specific grid of the 2D FFT grid, the value of the specific grid corresponding to each of the receive antennas is used to estimate the azimuth angle and the elevation angle of the obstacle. The FMCW radar resolves obstacles in the dimensions of range, relative velocity and angle. To accurately estimate position of the obstacle, it is required that the obstacle is resolved in any one of these dimensions. Thus, if there are multiple obstacles at the same distance from the FMCW radar and travelling with same relative velocity, the FMCW radar is required to resolve these obstacles in angle dimension. Thus, angle estimation and angle resolution is an important factor in determining the performance of the FMCW radar. The resolution and accuracy of the angle estimation is directly proportional to the number of antennas in the FMCW radar. As FMCW radars are used in a broad range of applications, their design becomes more cost-sensitive. Each antenna used to receive the scattered chirp has a distinct receiver path which includes amplifiers, mixers, ADCs and filters. Thus, the number of antennas used in the FMCW radar is a key factor in determining the overall cost of the FMCW radar. Therefore it is important to minimize the number of antennas in the FMCW radar and at the same time maintaining optimum performance level and accuracy.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a radar apparatus for estimating position of an obstacle of a plurality of obstacles. The radar apparatus includes an antenna unit. A signal processing unit is coupled to the antenna unit. The signal processing unit estimates an azimuth frequency, an elevation frequency and a range of the obstacle. The signal processing unit generates an estimated azimuth frequency, an estimated elevation frequency and an estimated range of the obstacle. A grazing angle detection module is coupled to the signal processing unit and estimates a metric from one or more of the estimated azimuth frequency, the estimated elevation frequency and the estimated range of the obstacle. The metric is compared to a threshold to detect an error in at least one of the estimated azimuth frequency and the estimated elevation frequency. A grazing angle error correction module is coupled to the grazing angle detection module and inverts a sign of at least one of the estimated azimuth frequency and the estimated elevation frequency on error detection.

Another embodiment provides a method of estimating position of an obstacle of a plurality of obstacles with a radar apparatus. The method provides estimating an azimuth frequency, an elevation frequency and a range of the obstacle to generate an estimated azimuth frequency, an estimated elevation frequency and an estimated rge of the obstacle. A metric is estimated from one or more of the estimated azimuth frequency, the estimated elevation frequency and the estimated range of the obstacle. The metric is compared to a threshold to detect an error in at least one of the estimated azimuth frequency and the estimated elevation frequency. On error detection, a sign of at least one of the estimated azimuth frequency and the estimated elevation frequency is inverted to generate a true estimated azimuth frequency and a true estimated elevation frequency respectively.

Yet another embodiment provides a radar apparatus. The radar apparatus includes an antenna unit that transmits an outbound radio frequency (RF) signal to an obstacle of the plurality of obstacles and receive an inbound RF signal from the obstacle. A transmitter is coupled to the antenna unit and generates the outbound RF signal. A receiver is coupled to the antenna unit and receives the inbound RF signal from the antenna unit. The outbound RF signal is scattered by the obstacle to generate the inbound RF signal. A mixer is coupled to the receiver and to the transmitter and demodulates the inbound RF signal to generate a demodulated signal. An analog to digital converter (ADC) coupled to the mixer and generates a digital signal in response to the demodulated signal received from the mixer. An FFT (fast fourier transform) module transforms the digital signal from time domain to frequency domain. A digital signal processor is coupled to the FFT module and processes the digital signal. The digital signal processor includes a signal processing unit that estimates an azimuth frequency, an elevation frequency and a range of the obstacle and generates an estimated azimuth frequency, an estimated elevation frequency and an estimated range of the obstacle. A grazing angle detection module is coupled to the signal processing unit and estimates a metric from one or more of the estimated azimuth frequency, the estimated elevation frequency and the estimated range of the obstacle. The metric is compared to a threshold to detect an error in at least one of the estimated azimuth frequency and the estimated elevation frequency. A grazing angle error correction module is coupled to the grazing angle detection module and configured to invert a sign of at least one of the estimated azimuth frequency and the estimated elevation frequency on error detection.

Other aspects and example embodiments are provided in the Drawings and the Detailed Description that follows.

BRIEF DESCRIPTION OF THE VIEWS OF DRAWINGS

Figure 1B:
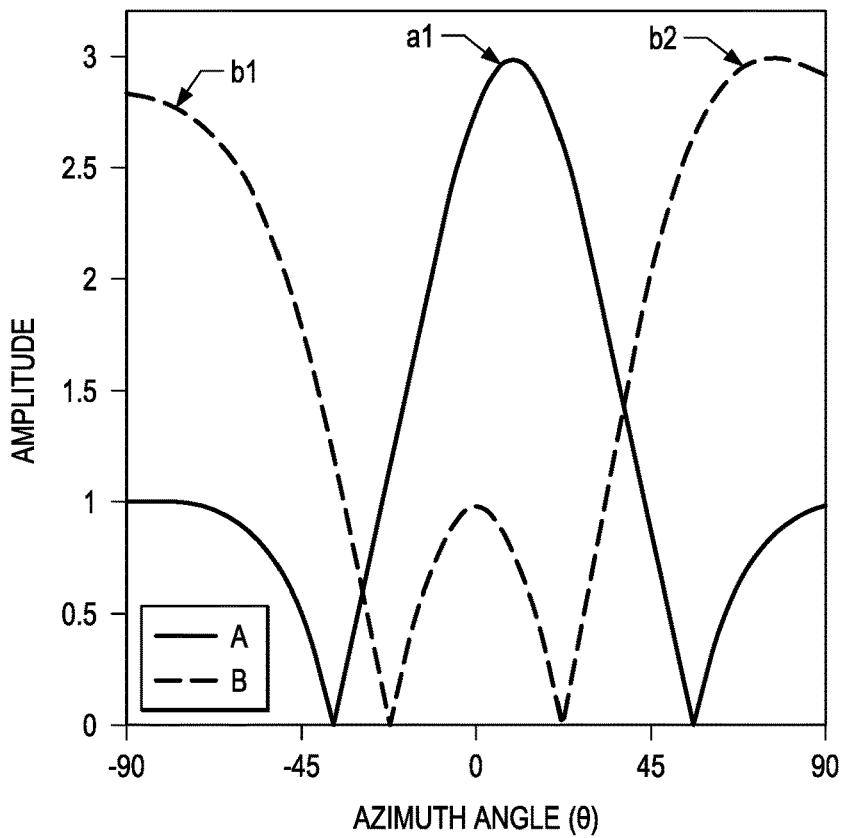
Figure 1C:
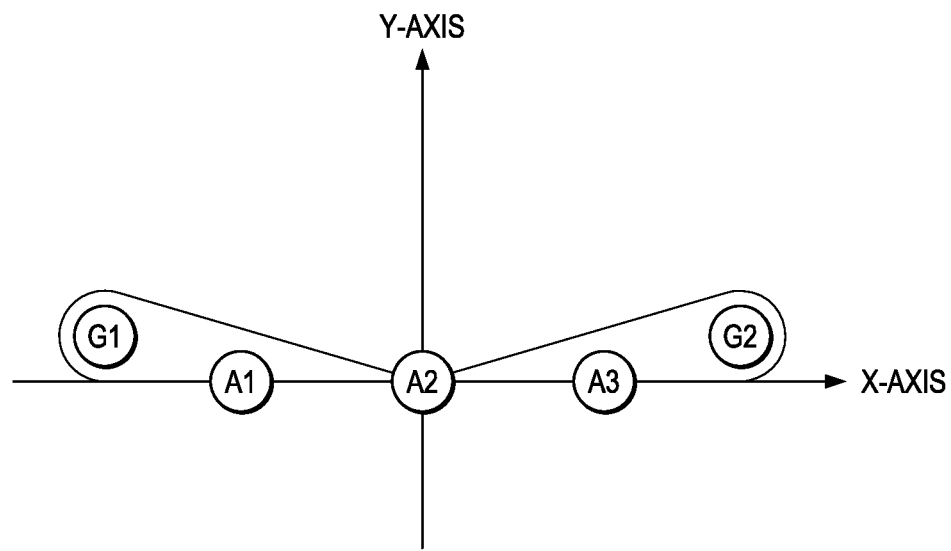
Figure 2A:
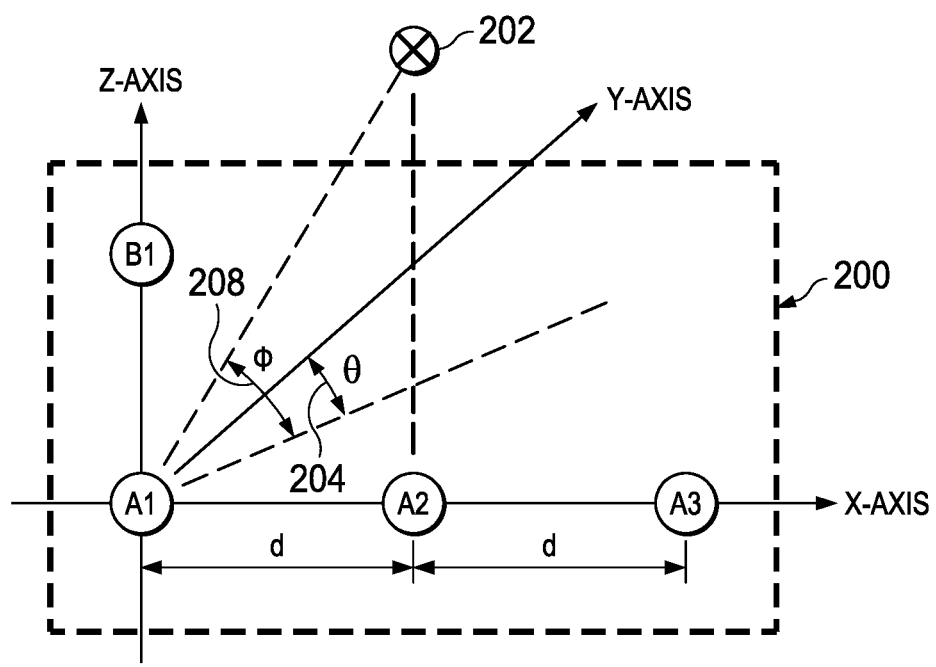
Figure 2B:
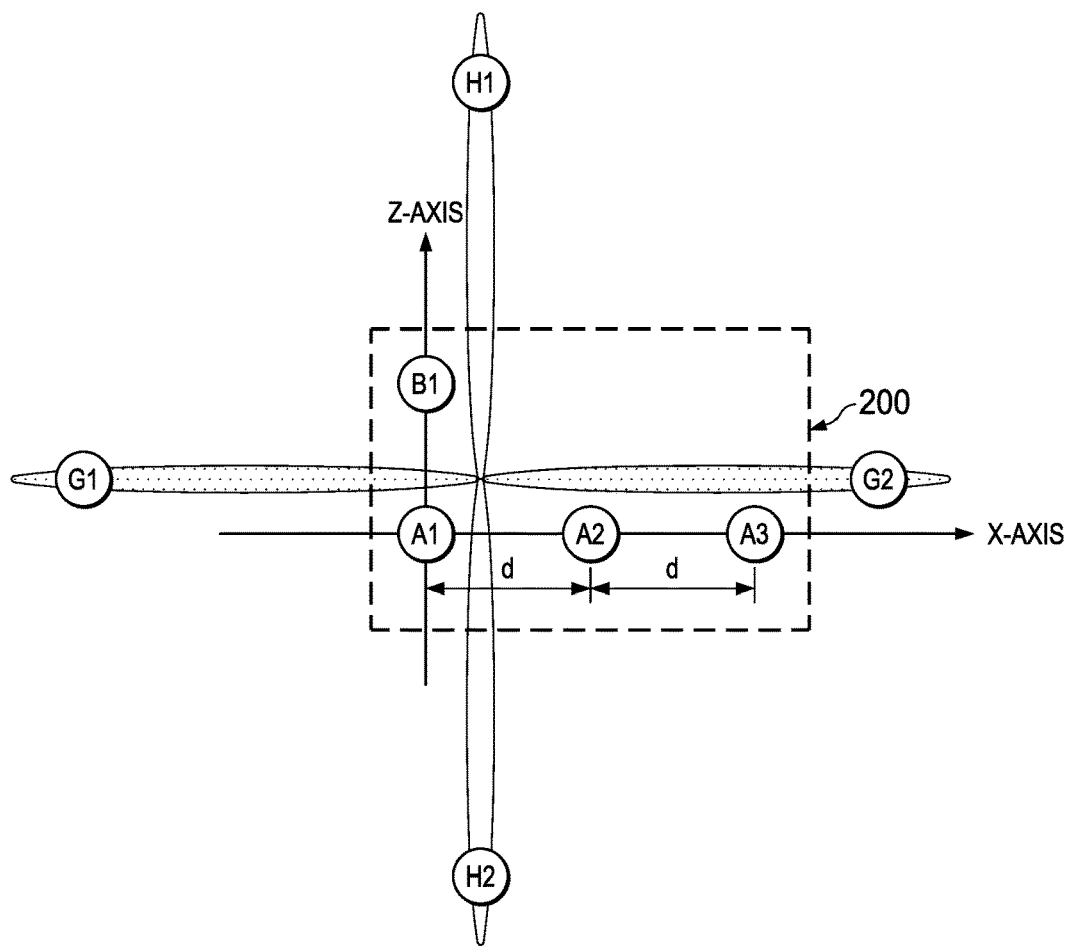
Figure 3A:
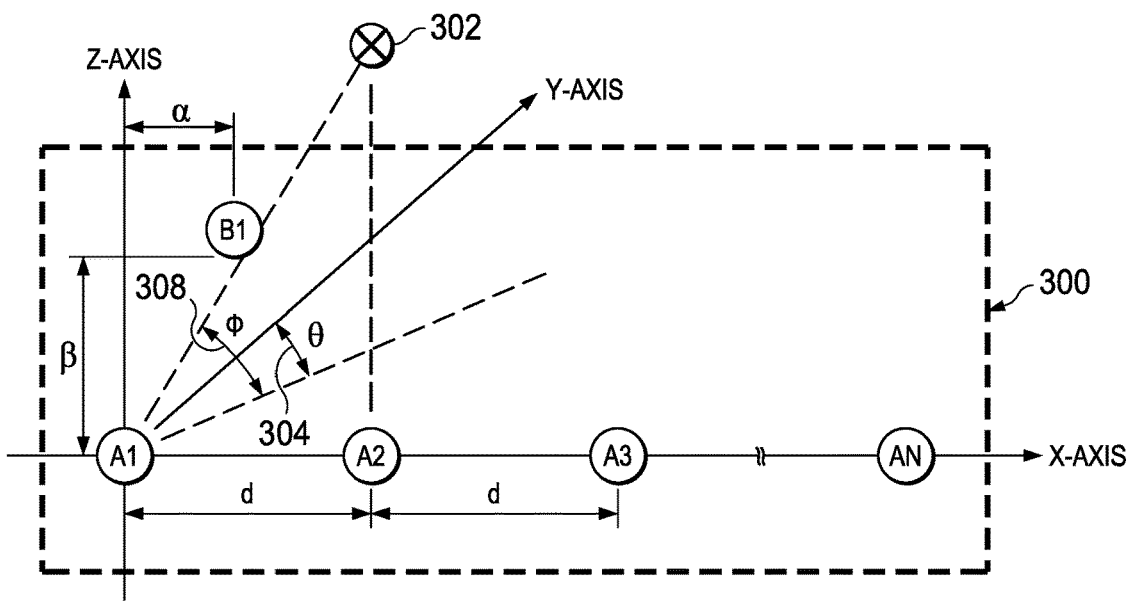
Figure 3B:
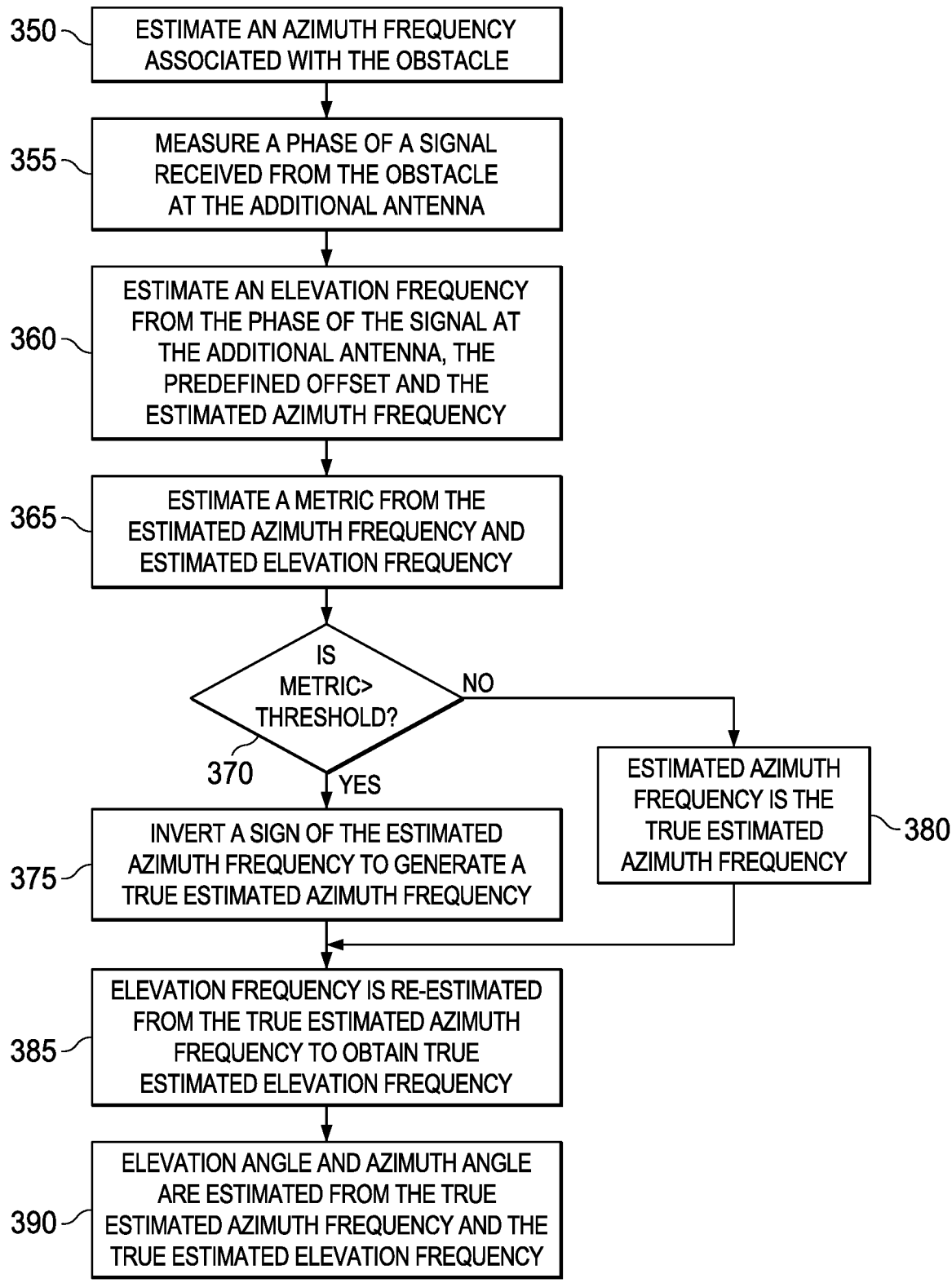
Figure 4:
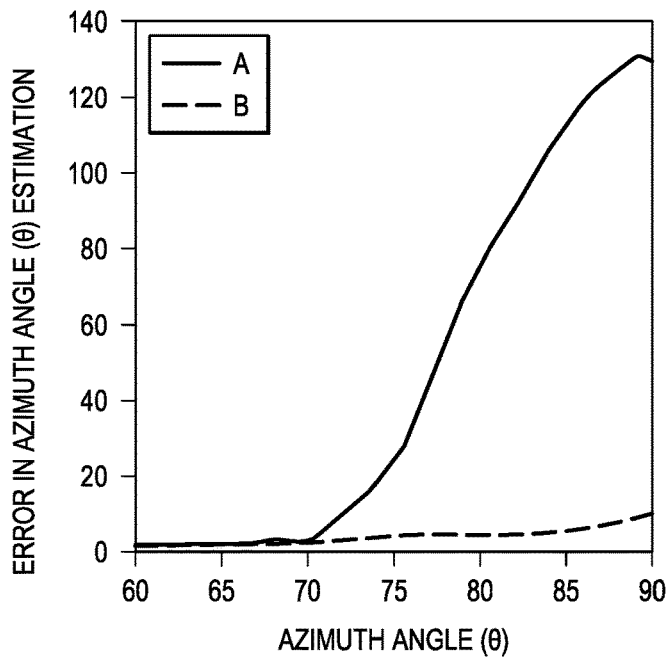
Figure 5A:
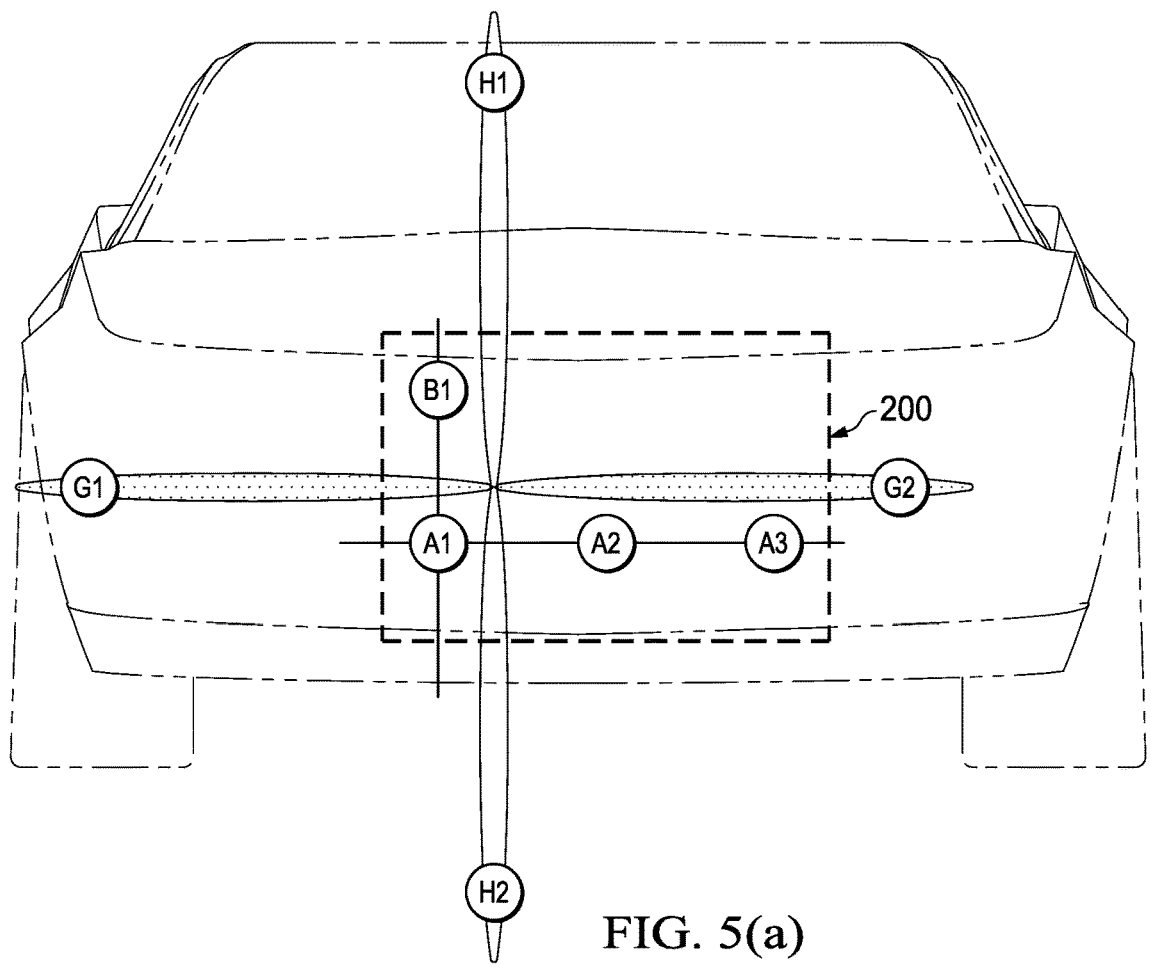
Figure 5B:
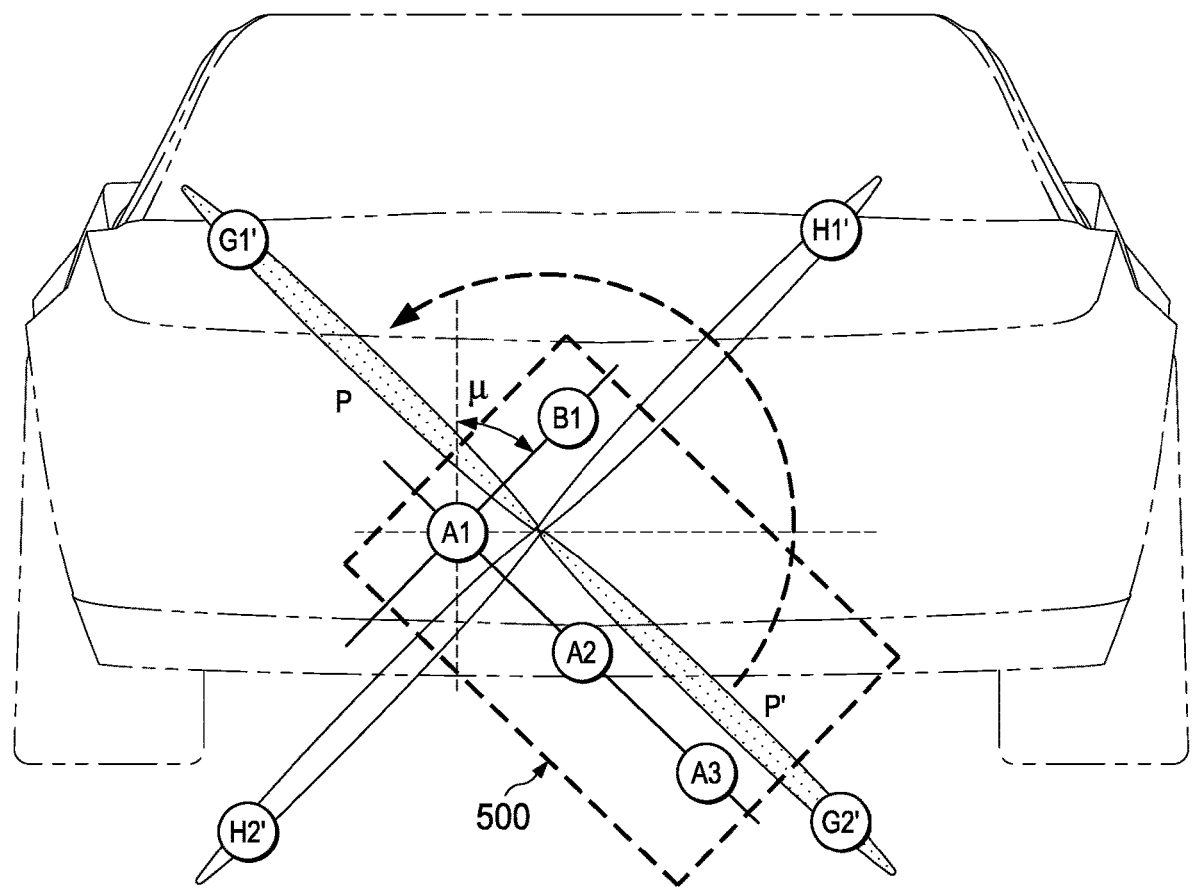
Figure 6A:
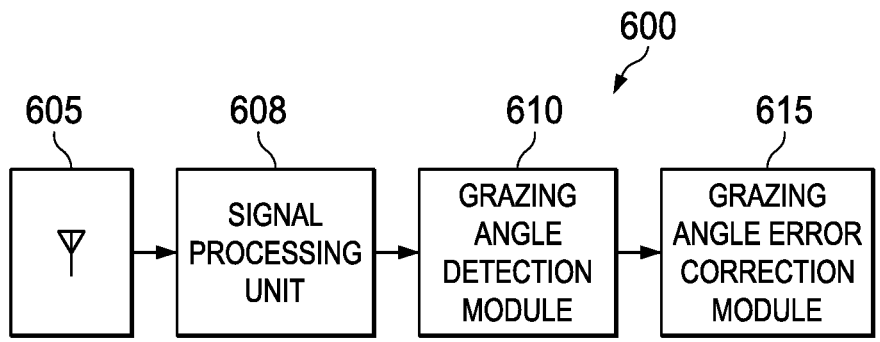
Figure 6B:
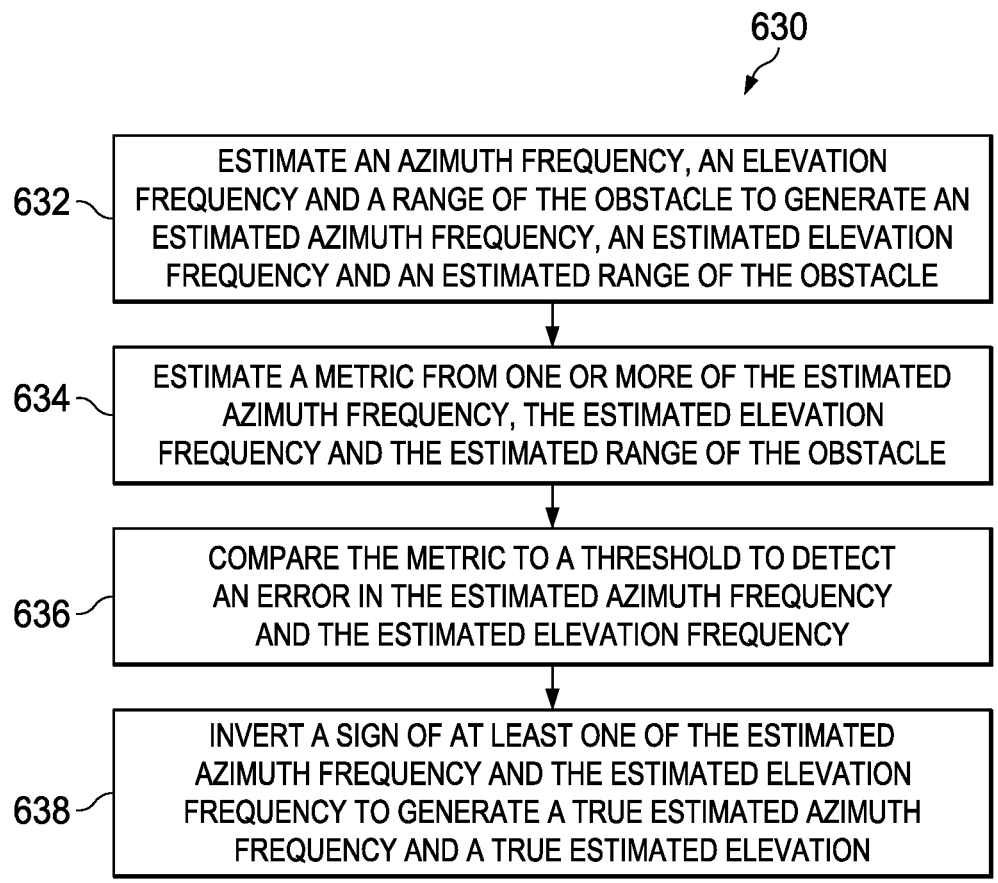
Figure 6C:
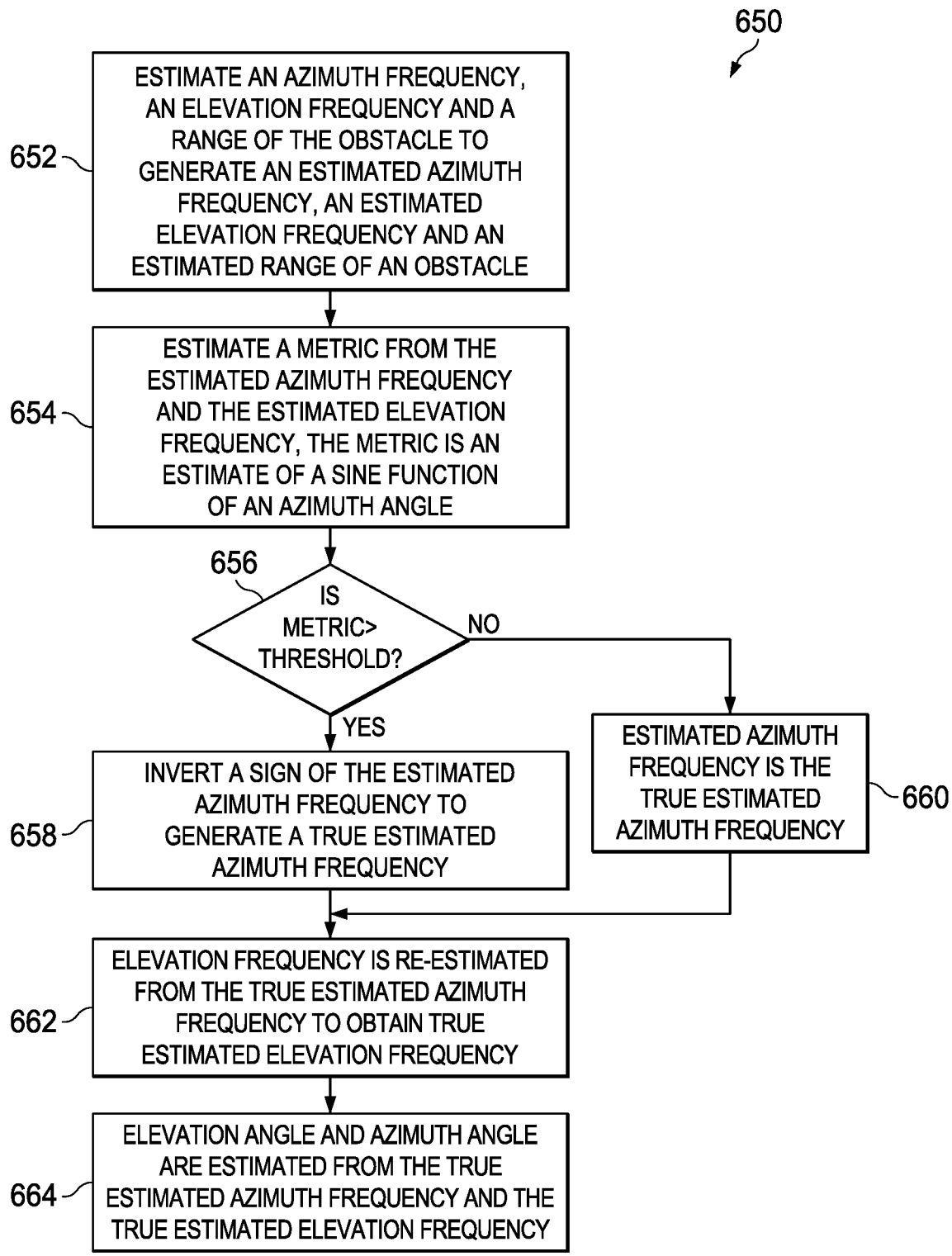
Figure 6D:
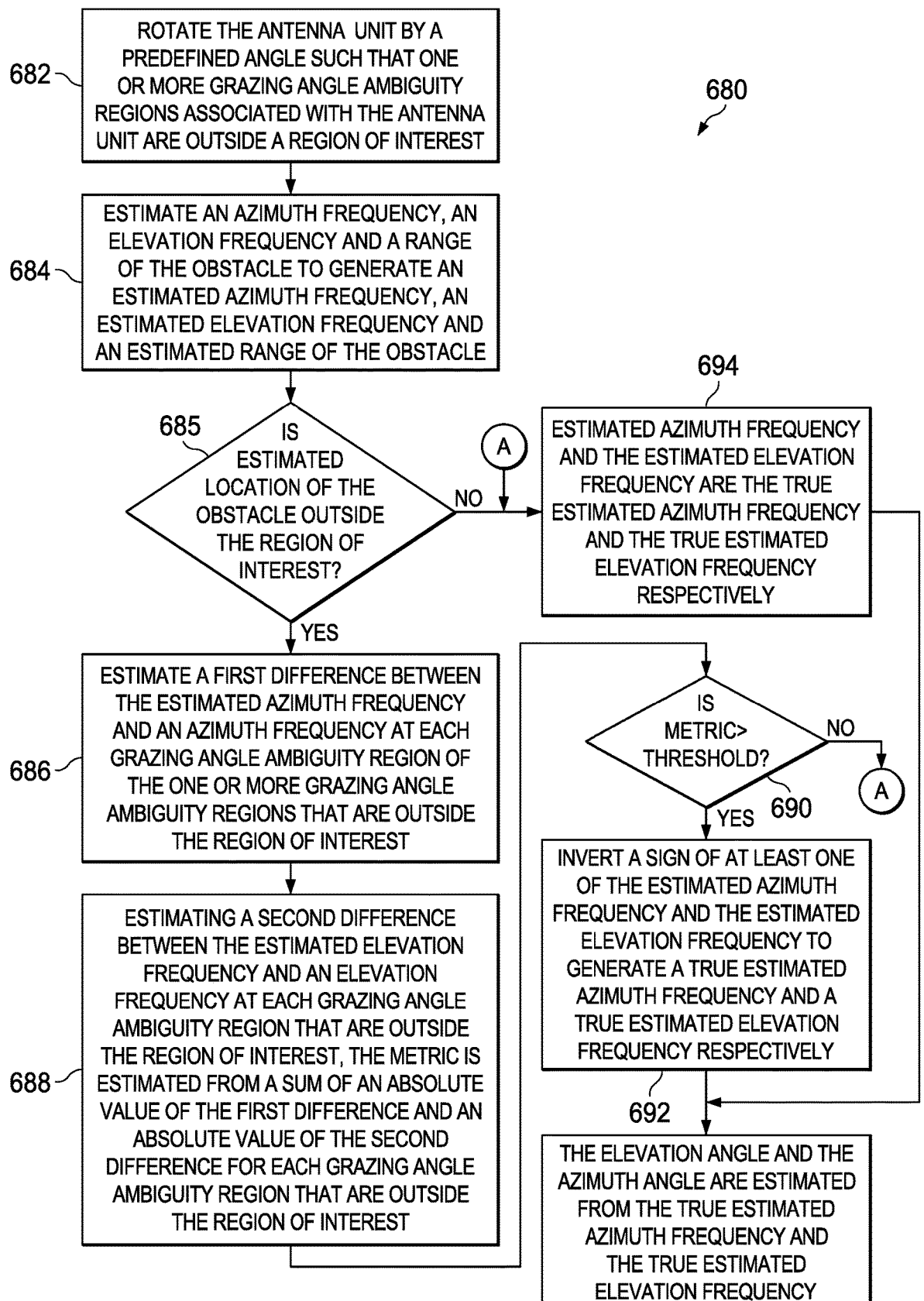
Figure 7A:
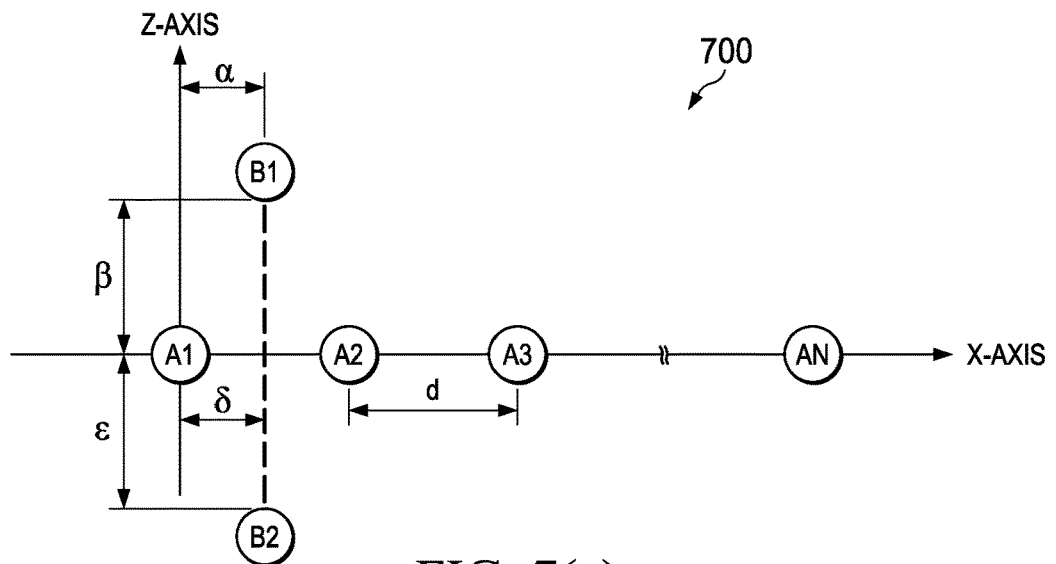
Figure 7B:
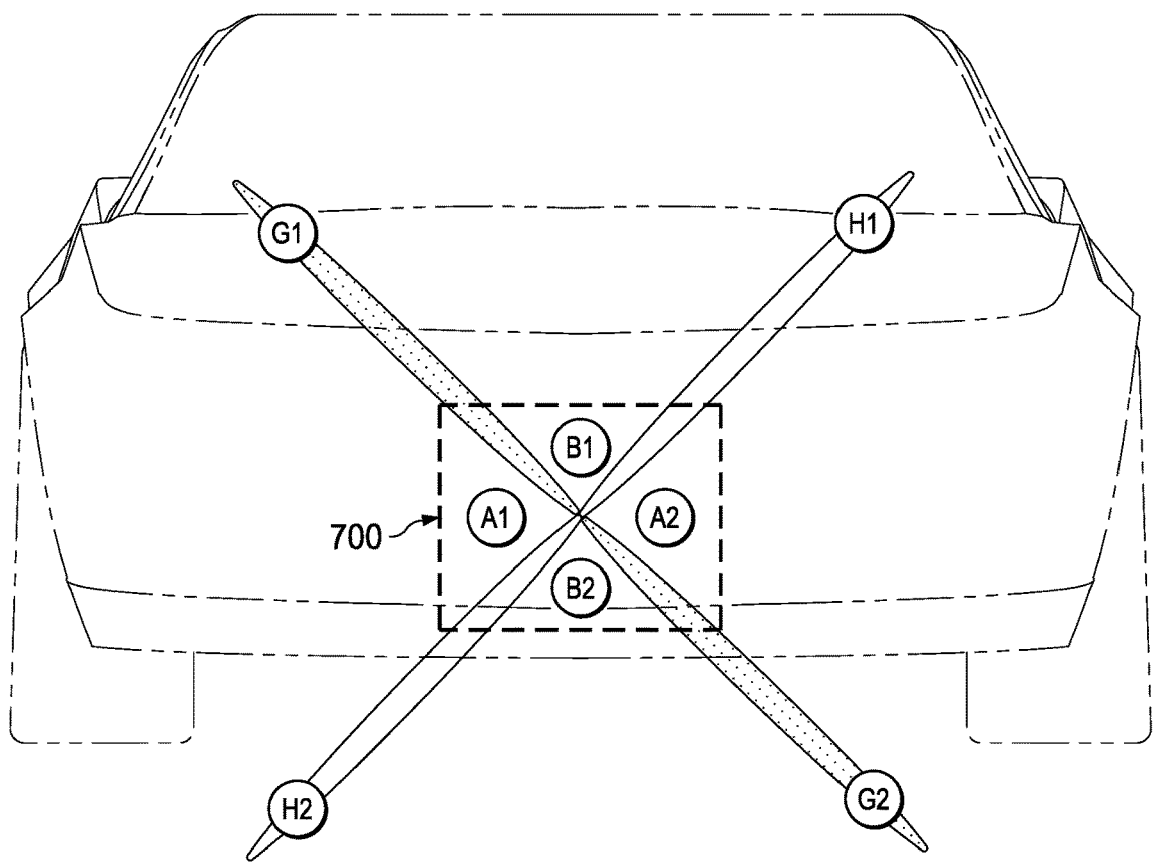
Figure 8:
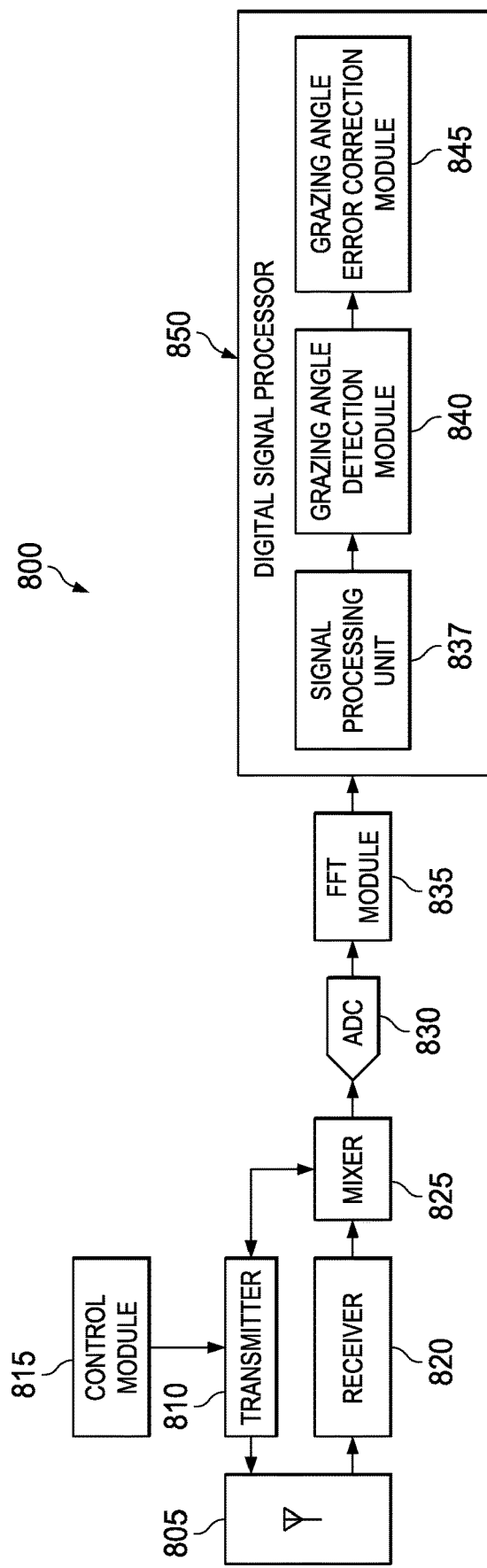

FIG. 1(a) illustrates an antenna unit in a radar apparatus;
FIG. 1(b) illustrates a response of the antenna unit to an obstacle;
FIG. 1(c) illustrates grazing angle ambiguity regions for the antenna unit;
FIG. 2(a) illustrates an antenna unit in a radar apparatus;
FIG. 2(b) illustrates grazing angle ambiguity regions associated with the antenna unit;
FIG. 3(a) illustrates an antenna unit in a radar apparatus, according to an embodiment;
FIG. 3(b) is a flowchart illustrating a method of estimating position of an obstacle of a plurality of obstacles with an antenna unit, according to an embodiment;
FIG. 4 illustrates a graphical comparison of the antenna unit 200 and the antenna unit 300, according to an embodiment;
FIG. 5(a) illustrates the antenna unit placed on a bumper of a vehicle;
FIG. 5(b) illustrates an antenna unit placed on a bumper of a vehicle, according to an embodiment;
FIG. 6(a) illustrates a radar apparatus, according to an embodiment;
FIG. 6(b) is a flowchart illustrating a method of estimating position of an obstacle of a plurality of obstacles with a radar apparatus, according to an embodiment;
FIG. 6(c) is a flowchart illustrating a method of estimating position of an obstacle of a plurality of obstacles with a radar apparatus, according to an embodiment;
FIG. 6(d) is a flowchart illustrating a method of estimating position of an obstacle of a plurality of obstacles with a radar apparatus, according to an embodiment;
FIG. 7(a) illustrates an antenna unit in a radar apparatus, according to an embodiment;
FIG. 7(b) illustrates the antenna unit placed on a bumper of a vehicle, according to an embodiment; and
FIG. 8 illustrates a radar apparatus, according to an embodiment.

DETAILED DESCRIPTION OF THE EMBODIMENTS

FIG. 1(a) illustrates an antenna unit 100 in a radar apparatus. The antenna unit 100 is integrated in a radar apparatus which is further integrated in an industrial or automotive application. The antenna unit 100 includes a linear array of antennas arranged in a horizontal plane. The linear array of antennas includes a plurality of antennas, for example, antenna A1, A2 and A3. For the sake of simplicity and understanding, the plurality of antennas is represented in FIG. 1(a) by antennas A1-A3. The linear array of antennas is represented to be placed along the X-axis. The adjacent antennas in the linear array of antennas are separated by a spacing d. Typical value of d is $\lambda/2$, where $\lambda$ is an operating wavelength of the antenna unit 100. The antenna unit 100 is configured to transmit an RF (radio frequency) signal and receives a scattered RF signal from an obstacle 102. The angle 104 ($\Theta$) represents an azimuth angle between the obstacle 102 and antenna unit. The azimuth angle 104 ($\Theta$) represents a direction of arrival of a scattered signal from the obstacle 102.

FIG. 1(b) illustrates a response of the antenna unit 100 to an obstacle 102 when d is $\lambda/2$. Graph A represents the response of the antenna unit 100 when the obstacle 102 is at Y axis (normal incidence) i.e. $\Theta$ is zero degrees. Graph B represents the response of the antenna unit 100 when $\Theta$ is 80 degrees. As illustrated, graph A has only one peak represented as a1 while graph B has two peaks b1 and b2. When direction of arrival is zero degrees, the antenna unit 100 is able to correctly detect the position of the obstacle 102. However, when the direction of arrival is 80 degrees, the response of the antenna unit 100 show two peaks i.e. b1 and b2. This is referred to as grazing angle problem since the antenna unit 100 cannot be used to estimate if the correct direction of arrival is around +80 degrees or −80 degrees, especially in the presence of noise. The grazing angle problem occurs as the magnitude of the direction of arrival or Θ increases and approaches the grazing angle. For a given spacing d, the grazing angle is defined as +/−sin$^{-1}$(λ/2d)). For d=λ/2, the computations by the radar apparatus are severely impacted when Θ is 90 degrees. This problem is further compounded if the distance (d) between antennas A1-A3 is further increased i.e. if d is increased. FIG. 1(c) illustrates grazing angle ambiguity regions for the antenna unit 100. The regions G1 and G2 represents regions for which the antenna unit 100 will not be able to resolve the direction of arrival and hence will not be able to correctly detect the position of the obstacle 102. That is why these regions are termed as grazing angle ambiguity regions.

FIG. 2(a) illustrates an antenna unit 200 in a radar apparatus. The antenna unit 200 is integrated in a radar apparatus which is further integrated in an industrial or automotive application. The antenna unit 200 includes a linear array of antenna arranged in a horizontal plane. The linear array of antennas includes a plurality of antennas, for example, antenna A1, A2 and A3. For the sake of simplicity and understanding, the plurality of antennas is represented in FIG. 2(a) by antennas A1-A3. The linear array of antennas is represented to be placed along the X-axis. The adjacent antennas in the linear array of antennas are separated by a spacing d. Typical value of d is λ/2, where λ is an operating wavelength of the antenna unit 200. The antenna unit 200 further includes an additional antenna B1 at an offset from at least one antenna in the linear array of antennas. An angle 204 (Θ) represents an azimuth angle between the obstacle 202 and the antenna unit 200 and an angle 208 (Φ) represents an elevation angle between the obstacle 202 and the antenna unit 200. The azimuth angle (Θ) 204 or the horizontal angle is defined as an angle between Y axis and a projection of a vector from the antenna A1 to the obstacle 202 on the XY plane. The elevation angle (Φ) 208 is an angle between a vector from antenna A1 to the obstacle 202 and the XY plane.

The antenna unit 200 is configured to transmit an RF (radio frequency) signal and receives a scattered signal from the obstacle 202. The signal received at the antenna unit 200 from the obstacle 202 is represented in equation 1 below. It is to be noted that the signal 'Y' represented in equation 1 depicts a signal obtained after a signal processing unit processes the signal received at the antenna unit 200. In an embodiment, the signal 'Y' depicts a signal obtained after performing 2D FFT on the signal received at each antenna in the antenna unit 200 from the obstacle 202.

$$Y = A[1 e^{-jw_x} e^{-j2w_x} e^{-jw_z}] \quad (1)$$

Where, $$w_x = (2\pi/\lambda) d \sin(\theta)\cos(\Phi) \quad (2)$$

$$w_z = (2\pi/\lambda) \beta \sin(\Phi) \quad (3)$$

$w_x$ is referred to as azimuth frequency and $w_z$ is referred to as elevation frequency. A is the complex amplitude corresponding to the obstacle. In equation 1, the component $e^{-jw_x}$ represents a factor as a result of the antenna A2, the component $e^{-j2w_x}$ represents a factor as a result of the antenna A3 and the component $e^{-jw_z}$ represents a factor as a result of the additional antenna B1. The azimuth frequency $w_x$ and the elevation frequency $w_z$ are estimated and then the azimuth angle (Θ) 204 and the elevation angle (Φ) 208 are calculated using the above equations. If multiple obstacles are identified by the antenna unit 200, then multiple pairs of $w_x$ and $w_z$ are estimated by the antenna unit 200. Thus, the azimuth angle (Θ) 204 and the elevation angle (Φ) 208 for the obstacle 202 can be estimated using the antenna unit 200.

FIG. 2(b) illustrates grazing angle ambiguity regions associated with the antenna unit 200. The regions G1 and G2 represent regions for which the antenna unit 200 will not be able to correctly detect the position of the obstacle 202. The regions H1 and H2 represent regions for which the antenna unit 200 will not be able to correctly detect the position of the obstacle 202. That is why these regions are termed as grazing angle ambiguity regions. Due to the grazing angle problem in the azimuth angle (Θ) 204 an obstacle located around region G1 can be wrongly estimated to be located in region G2. Likewise, due to the grazing angle problem in the elevation angle (Φ) an obstacle located around region H1 can be wrongly estimated to be located in region H2. Additionally the pair (G1, G2) and (H1, H2) are termed as ambiguous region pairs.

FIG. 3(a) illustrates an antenna unit 300 in a radar apparatus, according to an embodiment. In an embodiment, the antenna unit 300 is integrated in a radar apparatus which is further integrated in an industrial or automotive application. The antenna unit 300 includes a linear array of antennas. The linear array of antennas includes a plurality of antennas, for example, antenna A1, A2, A3 and AN, where AN is the N$^{th}$ antenna and N is an integer. For the sake of simplicity and understanding, the plurality of antennas represented in FIG. 3(a) will be represented as A1-AN further in the description. The linear array of antennas A1-AN is represented to be placed along the X-axis. The adjacent antennas in the linear array of antennas A1-AN are separated by a spacing d i.e. the antennas A1 and A2 are placed at d distance from each other. The antenna unit 300 further includes an additional antenna B1. The additional antenna B1 is at a predefined offset from at least one antenna in the linear array of antennas A1-AN. The predefined offset is (α, β) from the antenna A1 in the linear array of antennas A1-AN as illustrated in FIG. 3(a). α is a distance of the additional antenna B1 from the Z axis in the XZ plane and β is a distance of the additional antenna B1 from the X axis in the XZ plane. In one embodiment, the additional antenna B1 is not in XZ plane and a perpendicular distance of the additional antenna B1 from the XZ plane is γ. In one embodiment, α and β are multiples of λ/2, where λ is an operating wavelength of the antenna unit 300. In an embodiment, d is λ/2, a is λ/4, β is λ/2 and γ is 0.

For ease of understanding, we consider an embodiment in which the linear array of antennas consists of three antennas (A1, A2 and A3). The antenna unit 300 is configured to transmit an RF (radio frequency) signal and receives a scattered signal from an obstacle 302 of the plurality of obstacles. The signal received at the antenna unit 300 from the obstacle 302 is represented in equation 4 below. It is to be noted that the signal 'Y' represented in equation 4 depicts a signal obtained after a signal processing unit processes the signal received at the antenna unit 300. In an embodiment, the signal 'Y' depicts a signal obtained after performing 2D FFT on the signal received at each antenna in the antenna unit 300 from the obstacle 302.

$$Y = A\left[ 1 \quad e^{-jw_x} \quad e^{-j2w_x} \quad e^{-j\left(w_z + \frac{\alpha}{d} w_x\right)} \right] \quad (4)$$

where, A is the complex amplitude corresponding to the obstacle 302. $w_x$ is referred to as azimuth frequency and $w_z$ is referred to as elevation frequency, defined as:

$$w_x = (2\pi/\lambda) d \sin(\theta)\cos(\Phi) \quad (5)$$

$$w_z = (2\pi/\lambda) \beta \sin(\Phi) \quad (6)$$

In equation 4, the component $e^{-jw_x}$ represents a factor as a result of the antenna A2, the component $e^{-j2w_x}$ represents a factor as a result of the antenna A3 and the component $e^{-j(w_z a/d w_x)}$ represents a factor as a result of the additional antenna B1. The azimuth frequency $w_{x\_est}$ is estimated from the linear array of antennas A1-AN to obtain estimated azimuth frequency $w_{x\_est}$. In one embodiment, the signal processing unit coupled to the linear array of antennas A1-AN is configured to estimate the azimuth frequency $w_x$ using a suitable angle estimation algorithm known in the art to obtain estimated azimuth frequency $w_{x\_est}$.

An angle 304 ($\Theta$) represents an azimuth angle between the obstacle 302 and the antenna unit 300 and an angle 308 ($\Phi$) represents an elevation angle between the obstacle 302 and the antenna unit 300. The azimuth angle ($\Theta$) 304 or the horizontal angle is defined as an angle between Y axis and a projection of a vector from the antenna A1 to the obstacle 302 on the XY plane. The elevation angle ($\Phi$) 308 is an angle between a vector from antenna A1 to the obstacle 302 and the XY plane. The azimuth angle ($\Theta$) 304 and the elevation angle ($\Phi$) 308 are estimated using the following equations.

$$\phi = \sin^{-1}\left(\frac{w_{z\_est}}{(2\pi/\lambda)\beta}\right) \quad (7)$$

$$\theta = \sin^{-1}\left(\frac{w_{x\_est}}{(2\pi/\lambda)d\cos(\phi)}\right) = \quad (8)$$

$$\sin^{-1}\left(\frac{w_{x\_est}}{(2\pi/\lambda)d\cos\left(\sin^{-1}\left(\frac{w_{z\_est}}{(2\pi/\lambda)\beta}\right)\right)}\right) = \sin^{-1}(\xi)$$

$$\text{where, } w_{z\_est} = \psi - \frac{a}{d}w_{x\_est} \quad (9)$$

d represents the spacing between the adjacent antennas in the linear array of antennas A1-AN and $\psi$ represents a phase of a signal received from the obstacle 302 at the additional antenna B1. $\xi$ represents a metric. The phase of the signal $\psi$ at the additional antenna B1 is measured. The elevation frequency $w_z$ is estimated from the phase of the signal $\psi$ at the additional antenna B1, the predefined offset and the estimated azimuth frequency $w_{x\_est}$ as represented in equation 9 to obtain an estimated elevation frequency $w_{z\_est}$.

A process for grazing angle detection and grazing angle error correction is now explained, according to an embodiment. The metric is $\xi$ configured to be estimated from the estimated azimuth frequency $w_{x\_est}$ and the estimated elevation frequency $w_{z\_est}$. An error is detected in the estimated azimuth frequency $w_{x\_est}$ when the metric $\xi$ is above a threshold. In one embodiment, the threshold is a function of signal to noise ratio (SNR) of the signal received at the antenna unit 300. The metric $\xi$ is an estimate of a sine function of the azimuth angle ($\Theta$) 304. When the metric $\xi$ is above a threshold, an error is detected in the estimated azimuth frequency $w_{x\_est}$. If the metric $\xi$ is above a threshold, a sign of the estimated azimuth frequency $w_{x\_est}$ is inverted to generate a true estimated azimuth frequency. Thus, if the metric $\xi$ is above the threshold and the estimated azimuth frequency is $+w_{x\_est}$, a true estimated azimuth frequency will be $(-w_{x\_est})$. Similarly, if the metric $\xi$ is above the threshold and the estimated azimuth frequency is $(-w_{x\_est})$, a true estimated azimuth frequency will be $(+w_{x\_est})$. Thus, the magnitude of the true estimated azimuth frequency is same as estimated azimuth frequency $w_{x\_est}$. If the metric $\xi$ is below the threshold, the estimated azimuth frequency $w_{x\_est}$ is the true estimated azimuth frequency.

The elevation frequency $w_z$ for the obstacle 302 is re-estimated from the true estimated azimuth frequency. The elevation frequency $w_z$ is re-estimated from the phase of the signal $\psi$ at the additional antenna B1, the predefined offset and the true estimated azimuth frequency using equation 9 to generate a true estimated elevation frequency. The elevation angle ($\Phi$) 308 between the antenna unit 300 and the obstacle 302 is estimated from the true estimated elevation frequency as represented in equation 7. The azimuth angle ($\Theta$) 304 between the antenna unit 300 and the obstacle 302 is estimated from the elevation angle ($\Phi$) 308 and the true estimated azimuth frequency as represented in equation 8. In an embodiment, when plurality of obstacles are identified by the antenna unit 300, then azimuth frequency $w_x$ is estimated from the linear array of antennas A1-AN to obtain estimated azimuth frequency $w_{x\_est}$ for each obstacle of the plurality of obstacles. Also, phase of a signal received at the additional antenna B1 from each obstacle of the plurality of obstacles is measured. Thereafter, the true estimated azimuth frequency, the true estimated elevation frequency, the azimuth angle ($\Theta$) 304 and the elevation angle ($\Phi$) 308 is estimated for each obstacle of the plurality of obstacles using the similar approach discussed with reference to the obstacle 302.

Thus, the additional antenna B1 in the antenna unit 300, besides estimating the angle of elevation ($\Phi$) also helps in alleviating the grazing angle problem for azimuth angle ($\Theta$). This is explained with the help of the following example, with reference to an embodiment of the antenna unit 300 in which $d=\beta=\lambda/2$, $\alpha=\lambda/4$ and in which an obstacle is approaching the antenna unit 300 with an azimuth angle ($\Theta$) close to grazing angle (i.e. 90 degrees) and elevation angle ($\Phi$) close to zero degrees. The azimuth frequency $w_x$ is estimated from the linear array of antennas A1-AN to obtain estimated azimuth frequency $w_{x\_est}$. The elevation frequency $w_z$ is estimated from the phase of the signal $\psi$ at the additional antenna B1, the predefined offset and the estimated azimuth frequency $w_{x\_est}$ as represented in equation 9 to obtain an estimated elevation frequency $w_{z\_est}$. The metric $\xi$ is estimated from the estimated azimuth frequency $w_{x\_est}$ and the estimated elevation frequency $w_{z\_est}$. As illustrated in equation 7 and 8, an increase in absolute value of $\Phi$ will result in increase in the value of metric $\xi$. At grazing angles (i.e. angles close to 90 degrees) the metric $\xi$ will increase beyond 1, which is an undefined value of sine function (equation 8). Thus, an error is detected in the estimated azimuth frequency $w_{x\_est}$. Therefore a sign of the estimated azimuth frequency $w_{x\_est}$ is inverted to generate the true estimated azimuth frequency. Subsequently, the elevation frequency $w_z$, for the obstacle 302 is re-estimated from the true estimated azimuth frequency to obtain true estimated elevation frequency.

Thus the antenna unit 300 is able to address the grazing angle problem as the antenna unit 300 would be able to determine azimuth angle ($\Theta$) accurately using the above mentioned approach. The antenna unit 300 will not have the grazing angle ambiguity regions G1 and G2 discussed with reference to FIG. 2(b) earlier in the description. The antenna unit 300 uses a computationally simple approach to detect and correct the grazing angle problem that can work in conjunction with any angle estimation algorithm for estimating the azimuth and elevation frequencies of a plurality of obstacles.

FIG. 3(b) is a flowchart illustrating a method of estimating position of an obstacle of a plurality of obstacles with an antenna unit 300, according to an embodiment. At step 350, an azimuth frequency associated with the obstacle is estimated to obtain an estimated azimuth frequency. As illustrated for antenna unit 300, the azimuth frequency $w_x$ is estimated from the linear array of antennas A1-AN to obtain an estimated azimuth frequency $w_{x\_est}$. At step 355, a phase of the signal received from the obstacle at the additional antenna, for example additional antenna B1 in the antenna unit 300, is measured. At step 360, the elevation frequency $w_z$ is estimated from the phase of the signal ψ at the additional antenna B1, the predefined offset and the estimated azimuth frequency $w_{x\_est}$ as represented in equation 9 to obtain an estimated elevation frequency $w_{z\_est}$. The metric ξ is estimated from the estimated azimuth frequency $w_{x\_est}$ and the estimated elevation frequency $w_{z\_est}$ at step 365. At step 370, a condition check is made if the metric is above a threshold. In one embodiment, the threshold is a function of signal to noise ratio (SNR) of the signal received at the antenna unit 300. If the metric is above the threshold, an error is detected in the estimated azimuth frequency. A sign of the estimated azimuth frequency is inverted to generate a true estimated azimuth frequency, at step 375. If the metric is below the threshold, the system proceeds to step 380 where the estimated azimuth frequency is the true estimated azimuth frequency. At step 385, the elevation frequency for the obstacle is re-estimated from the true estimated azimuth frequency to obtain a true estimated elevation frequency. At step 390, an elevation angle and an azimuth angle associated with the obstacle are estimated from the true estimated azimuth frequency and the true estimated elevation frequency.

FIG. 4 illustrates a graphical comparison of the antenna unit 200 and the antenna unit 300, according to an embodiment. d=β=/2, α=λ/4 and γ=0 is considered for this analysis. The graph depicts the error in azimuth angle (Θ) estimation on Y axis against the azimuth angle (θ) on X axis. Curve A represents the response of the antenna unit 200. As illustrated in curve A, the error in the estimation of azimuth angle (Θ) increases as the azimuth angle (Θ) approaches 90 degrees. Thus the error in the estimation of azimuth angle is large when an obstacle is approaching a vehicle comprising the antenna unit 200 at angles in the range of 70 degrees to 90 degrees. This is because of the grazing angle problem, in which the antenna unit 200 is not able to resolve if the correct azimuth angle has a positive sign or a negative sign for example +80 degrees or −80 degrees. Curve B represents the response of the antenna unit 300. As illustrated in curve B, the antenna unit 300 is able to detect the correct position of obstacle even when the azimuth angle (Θ) is approaching 90 degrees. This is because the antenna unit 300 with the help of additional antenna B1 is able to identify the azimuth angle (Θ) accurately. Thus, the error in azimuth angle (Θ) estimation is minimal in the antenna unit 300 as compared to the error in the antenna unit 200 as seen in the graphical comparison in FIG. 4.

FIG. 5(a) illustrates the antenna unit 200 placed on a bumper of a vehicle. The regions G1, G2, H1 and H2 represent grazing angle ambiguity regions for the antenna unit 200. The antenna unit 200 can have one or more grazing angle ambiguity regions. The regions G1, G2, H1, and H2 represent regions for which the antenna unit 200 will not be able to correctly detect the position of an obstacle. Each of the grazing angle ambiguity regions correspond to regions close to a specific azimuth and elevation angle. For example, the grazing angle ambiguity region G1 corresponds to the region close to azimuth angle of −90 degrees and the elevation angle of 0 degrees. Similarly the regions G2, H1, H2 corresponds to the regions close to the azimuth angle and the elevation angle of (90 degrees, 0 degrees), (0 degrees, 90 degrees) and (0 degrees, −90 degrees) respectively. It is convenient to refer to these angle pairs in terms of their azimuth frequency and elevation frequency. The grazing angle ambiguity points for the regions G1, G2, H1, H2 are defined as (−pi/2, 0), (pi/2, 0), (0, pi/2) and (0, −pi/2) respectively, where the first element in the ordered pair refers to the azimuth frequency in radians and the second element in the ordered pair refers to the elevation frequency in radians. These 4 grazing angle ambiguity points corresponding to the regions G1, G2, H1, H2 in terms of frequency are denoted by ($w_{xa1}$, $w_{za1}$), ($w_{xa2}$, $w_{za2}$), ($w_{xa3}$, $w_{za3}$), ($w_{xa4}$, $w_{za4}$) respectively.

FIG. 5(b) illustrates an antenna unit 500 placed on a bumper of a vehicle, according to an embodiment. The antenna unit 500 is similar in function and operation to the antenna unit 200 explained with reference to FIG. 2(a). However, the antenna unit 200 is rotated by an angle μ to obtain antenna unit 500. Note that in the present discussion, for the ease of understanding and calculations, this rotation also rotates the x axis and the z axis, and thus the azimuth angle and the elevation angle are also suitably rotated. In one embodiment, angle μ for the antenna unit 500 is 45 degrees. For the antenna unit 500, the rotation by an angle μ moves a significant portion of the grazing angle ambiguity regions H2 and G2 (denoted as H2' and G2') below the ground. However an obstacle below the ground is outside a region of interest of a moving vehicle, since obstacles that are likely to be encountered by the moving vehicle are going to be above the ground. In an embodiment, the region of interest is a region which is above the ground and within a definite distance from the vehicle. An obstacle detected by the antenna unit 500 in the grazing angle ambiguity regions H2' and G2' are mapped to their complementary locations above the ground i.e. H1' and G1' respectively.

A process for grazing angle detection and grazing angle error correction is now explained, according to an embodiment. In an embodiment, a signal processing unit is coupled to the antenna unit 500. The signal processing unit coupled to the antenna unit 500 is configured to estimate an azimuth frequency, an elevation frequency, and a range of an obstacle of a plurality of obstacles to generate an estimated azimuth frequency, an estimated elevation frequency and an estimated range of the obstacle. The estimated azimuth frequency, the estimated elevation frequency and the estimated range of the obstacle are used to determine the co-ordinates of the obstacle which is then used to determine if the obstacle lies outside the region of interest. If it is determined that the object lies outside the region of interest then the following procedure is adopted. A first difference between the estimated azimuth frequency and an azimuth frequency at each grazing angle ambiguity region of the one or more grazing angle ambiguity regions is estimated. A second difference between the estimated elevation frequency and an elevation frequency at each grazing angle ambiguity region of the one or more grazing angle ambiguity regions is estimated. A metric is estimated from a sum of an absolute value of the first difference and an absolute value of the second difference for each grazing angle ambiguity region. In an embodiment, the metric (γ) is given as $$\gamma = \min_i(|\omega_{xai} - \omega_{x\_est}| + |\omega_{zai} - \omega_{z\_est}|) \quad (10)$$

The metric (γ) is calculated for i=1, 2, 3, and 4 and compared with a threshold to detect an error in the estimated azimuth frequency and the estimated elevation frequency. In one embodiment, the threshold is a function of signal to noise ratio (SNR) of the signal received at the antenna unit 500. In one embodiment, the metric is a function of the first difference and the second difference. When the metric (γ) is below a threshold for any given value of i, a grazing angle error is detected and it is ascertained if the obstacle is outside the region of interest. If the obstacle is outside the region of interest, the grazing angle error is detected. Once the grazing angle error is detected, grazing error correction process is commenced to map the obstacle to a complementary locations above the ground. In the grazing angle error correction process, a sign of at least one of the estimated azimuth frequency and the estimated elevation frequency is inverted to generate a true estimated azimuth frequency and a true estimated elevation frequency respectively, when the metric (γ) is below the threshold. The estimated azimuth frequency and the estimated elevation frequency are the true estimated azimuth frequency and the true estimated elevation frequency respectively, when the metric (γ) is above the threshold. In one embodiment, a sign of the estimated azimuth frequency and the estimated elevation frequency is inverted to generate a true estimated azimuth frequency and a true estimated elevation frequency respectively. As an example, in FIG. 5(b), an obstacle detected at location P' in the region G2' is mapped to the corresponding location P in the region G1'. Thus the antenna unit 500 addresses the grazing angle problem to a significant extent. The above described technique of rotation of antenna can be applied to any antenna unit to address the grazing angle problem. This method is computationally simple and works in conjunction with any angle estimation methods known in the art. The angle estimation method can run independent of any mathematical constraints imposed by the region of interest. Further, the method of grazing angle error correction does not require the angle estimation procedure to be repeated.

FIG. 6(a) illustrates a radar apparatus 600 according to an embodiment. The radar apparatus 600 includes an antenna unit 605. A signal processing unit 608 is coupled to the antenna unit 605. A grazing angle detection module 610 is coupled to the signal processing unit 608 and a grazing angle error correction module 615 is coupled to the grazing angle detection module 610. The radar apparatus 600 may include one or more additional components known to those skilled in the relevant art and are not discussed here for simplicity of the description. It is noted that the radar apparatus 600 is one of the many ways of implementing radar apparatus and variations, and alternative constructions are apparent and well within the spirit and scope of the disclosure.

In the following flowcharts, the specifically disclosed operations, sequences, and formats are provided to explain the logical flow of the methods and are understood not to limit the scope of the present disclosure.

FIG. 6(b) is a flowchart 630 illustrating a method of estimating position of an obstacle of a plurality of obstacles with a radar apparatus, according to an embodiment. The flowchart 630 is illustrated with the radar apparatus 600. At step 632, the signal processing unit 608 estimates an azimuth frequency, an elevation frequency and a range of the obstacle and generates an estimated azimuth frequency, an estimated elevation frequency and an estimated range of the obstacle. In an embodiment, the step 632 is performed in a logic unit in the radar apparatus 600. At step 634, the grazing angle detection module 610 estimates a metric from one or more of the estimated azimuth frequency, the estimated elevation frequency and the estimated range of the obstacle. At step 636, the metric is compared to a threshold to detect an error in at least one of the estimated azimuth frequency and the estimated elevation frequency. In one embodiment, the threshold is a function of signal to noise ratio (SNR) of the signal received at the antenna unit 605. At step 638, the grazing angle error correction module 615 on error detection, inverts a sign of at least one of the estimated azimuth frequency and the estimated elevation frequency to generate a true estimated azimuth frequency and a true estimated elevation frequency respectively. In one embodiment, when the error is not detected in at least one of the estimated azimuth frequency and the estimated elevation frequency, the estimated azimuth frequency and the estimated elevation frequency are the true estimated azimuth frequency and the true estimated elevation frequency respectively.

FIG. 6(c) is a flowchart 650 illustrating a method of estimating position of an obstacle of a plurality of obstacles with a radar apparatus, according to an embodiment. The flowchart 650 is illustrated with the radar apparatus 600. At step 652, the signal processing unit 608 estimates an azimuth frequency, an elevation frequency and a range of the obstacle and generates an estimated azimuth frequency, an estimated elevation frequency and an estimated range of the obstacle. In an embodiment, the step 652 is performed in a logic unit in the radar apparatus 600. At step 654, the grazing angle detection module 610 estimates a metric from the estimated azimuth frequency and the estimated elevation frequency. The metric is an estimate of a sine function of an azimuth angle associated with the obstacle. In one embodiment, the metric is a function of an estimate of the azimuth angle. At step 656, the metric is compared to a threshold to detect an error in the estimated azimuth frequency. In one embodiment, the threshold is a function of signal to noise ratio (SNR) of the signal received at the antenna unit 605. When the metric is above the threshold, the error is detected in the estimated azimuth frequency and the system proceeds to step 658. At step 658, the grazing angle error correction module 615 inverts a sign of the estimated azimuth frequency to generate a true estimated azimuth frequency. In an embodiment, the step 658 is performed by a logic unit in the radar apparatus 600. At step 660, when metric is below the threshold i.e. the error is not detected, the estimated azimuth frequency is the true estimated azimuth frequency and the system proceed to step 662. At step 662, the elevation frequency is re-estimated from the true estimated azimuth frequency to obtain true estimated elevation frequency. At step 664, an elevation angle and the azimuth angle associated with the obstacle are estimated from the true estimated azimuth frequency and the true estimated elevation frequency.

FIG. 6(d) is a flowchart 680 illustrating a method of estimating position of an obstacle of a plurality of obstacles with a radar apparatus, according to an embodiment. The flowchart 680 is illustrated with the radar apparatus 600. At step 682, the antenna unit 605 is rotated by a predefined angle such that one or more grazing angle ambiguity regions associated with the antenna unit 605 are outside a region of interest. In an embodiment, the rotation of the antenna unit 605 is performed only once at the time of mounting the antenna unit 605 on a vehicle. It is preferable to choose the angle of rotation such that at least one of the grazing angle ambiguity regions in each ambiguous region pair is outside the region of interest. In one of the embodiment, the antenna unit 605 is rotated by 45 degrees. At step 684, the signal processing unit 608 estimates an azimuth frequency, an elevation frequency and a range of the obstacle and generates an estimated azimuth frequency, an estimated elevation frequency and an estimated range of the obstacle. In an embodiment, the step 684 is performed in a logic unit in the radar apparatus 600. At step 685, it is determined if the estimated location of the obstacle is outside the region of interest. The estimated location of the obstacle is computed using the estimated azimuth frequency, the estimated elevation frequency and the estimated range of the obstacle. If the estimated location of the obstacle is outside the region of interest, the system proceeds to step 686. Otherwise, the system proceeds to step 694. At step 686, the grazing angle detection module 610 estimates a first difference between the estimated azimuth frequency and an azimuth frequency at each grazing angle ambiguity region of the one or more grazing angle ambiguity regions that are outside the region of interest. At step 688, a second difference between the estimated elevation frequency and an elevation frequency at each grazing angle ambiguity region of the one or more grazing angle ambiguity regions that are outside the region of interest. The metric is estimated from a sum of an absolute value of the first difference and an absolute value of the second difference for each grazing angle ambiguity region. In one embodiment, the metric is a function of the first difference and the second difference. At step 690, the metric is compared with a threshold to detect an error in at least one of the estimated azimuth frequency and the estimated elevation frequency. In one embodiment, the threshold is a function of signal to noise ratio (SNR) of the signal received at the antenna unit 605. When the metric is below the threshold, an error is detected in at least one of the estimated azimuth frequency and the estimated elevation frequency and the system proceed to step 692. At step 692, the grazing angle error correction module 615 inverts a sign of at least one of the estimated azimuth frequency and the estimated elevation frequency to generate a true estimated azimuth frequency and a true estimated elevation frequency respectively. In one embodiment, a sign of the estimated azimuth frequency and the estimated elevation frequency is inverted to generate a true estimated azimuth frequency and a true estimated elevation frequency respectively. At step 694, when the metric is above the threshold, the estimated azimuth frequency and the estimated elevation frequency are the true estimated azimuth frequency and the true estimated elevation frequency respectively and the system proceeds to step 696. At step 696, the elevation angle and the azimuth angle are estimated from the true estimated azimuth frequency and the true estimated elevation frequency.

FIG. 7(*a*) illustrates an antenna unit 700 in a radar apparatus, according to an embodiment. In an embodiment, the antenna unit 700 is integrated in a radar apparatus which is further integrated in an industrial or automotive application. The antenna unit 700 includes a linear array of antenna arranged in a first horizontal plane. The linear array of antennas includes a plurality of antennas, for example, antenna A1, A2, A3 and AN, where AN is the N$^{th}$ antenna and N is an integer. For the sake of simplicity and understanding, the plurality of antennas represented in FIG. 7(*a*) will be represented as A1-AN further in the description. The linear array of antennas A1-AN is represented to be placed along the X-axis. The adjacent antennas in the linear array of antennas A1-AN are separated by a spacing d i.e. the antennas A1 and A2 are placed at d distance from each other. The antenna unit 700 further includes an additional antenna B1 in a second horizontal plane and a second additional antenna B2 in a third horizontal plane. The first horizontal plane is parallel to the second horizontal plane and the third horizontal plane. The additional antenna B1 is at a predefined offset from at least one antenna in the linear array of antennas A1-AN. The predefined offset is ($\alpha$, $\beta$) from the antenna A1 in the linear array of antennas A1-AN. $\alpha$ is a distance of the additional antenna B1 from the Z axis in the XZ plane and $\beta$ is a distance of the additional antenna B1 from the X axis in the XZ plane. In one embodiment, the additional antenna B1 is not in XZ plane and a perpendicular distance of the additional antenna B1 from the XZ plane is $\gamma$. In one embodiment, the predefined offset is a multiple of $\lambda/2$, where $\lambda$ is an operating wavelength of the antenna unit 700. In an embodiment, $\alpha$ is $\lambda/4$ and $\beta$ is $\lambda/2$. In an embodiment, the spacing d between adjacent antennas in the linear array of antennas is a multiple of $\lambda/2$. The second additional antenna B2 is at a second predefined offset from at least one antenna in the linear array of antennas A1-AN. The second predefined offset is ($\delta$, $\epsilon$) from the antenna A1 in the linear array of antennas A1-AN. $\delta$ is a distance of the second additional antenna B2 from the Z axis in the XZ plane and $\epsilon$ is a distance of the second additional antenna B2 from the X axis in the XZ plane. In one embodiment, the second additional antenna B2 is not in XZ plane and a perpendicular distance of the additional antenna B1 from the XZ plane is $\eta$. In one embodiment, the second predefined offset is a multiple of $\lambda/2$, where $\lambda$ is an operating wavelength of the antenna unit 700. In an embodiment, $\delta$ is $\lambda/4$ and $\epsilon$ is $\lambda/2$. In an embodiment, $\alpha$ is equal to $\delta$ and $\beta$ is equal to $\epsilon$. In an embodiment, the additional antenna B1 and the second additional antenna B2 are in a same vertical plane for example as illustrated, the linear array of antennas A1-AB, the additional antenna B1 and the second additional antenna B2 are in XZ plane.

The operation of the linear array of antenna A1-AN and the additional antenna B1 is similar to the antenna unit 300 and is therefore not explained again for brevity reasons. FIG. 7(*b*) illustrates the antenna unit 700 placed on a bumper of a vehicle, according to an embodiment. The regions G1, G2, H1 and H2 represent grazing angle ambiguity regions for the antenna unit 700. These regions represent a range for which the antenna unit 700 will not be able to resolve the direction of arrival and hence will not be able to correctly detect the position of an obstacle 102. However an obstacle below the ground is outside the region of interest of a moving vehicle, since obstacles that are likely to be encountered by the moving vehicle are going to be above the ground. An obstacle detected by the antenna unit 700 in the grazing angle ambiguity regions H2 and G2 are mapped to their complementary locations above the ground i.e. H1 and G1 respectively. As an example is FIG. 7(*b*), an obstacle detected in the region G2 is mapped to the corresponding region G1. Thus the antenna unit 700 addresses the grazing angle problem to a significant extent.

FIG. 8 illustrates a radar apparatus 800 according to an embodiment. The radar apparatus includes an antenna unit 805. A transmitter 810 and a receiver 820 are coupled to the antenna unit 805. A control module 815 is coupled to the transmitter 810. A mixer 825 is coupled to the receiver 820 and to the transmitter 810. An analog to digital converter (ADC) 830 is coupled to the mixer 825 and an FFT (fast fourier transform) module 835 is coupled to the ADC 830. A digital signal processor (DSP) 850 is coupled to the FFT module 835. The DSP 850 includes a signal processing unit 837, a grazing angle detection module 840 and a grazing angle error correction module 845 coupled to the grazing angle detection module. In an embodiment, all the components of the radar apparatus 800 are integrated on a chip. In other embodiment, all the components of the radar apparatus 800 except the DSP 850 are integrated on a chip. The radar apparatus 800 may include one or more additional components known to those skilled in the relevant art and are not discussed here for simplicity of the description.

The operation of the radar apparatus 800 illustrated in FIG. 8 is explained now. The antenna unit 805 is analogous to at least one of the antenna unit 300, antenna unit 500 and antenna unit 605 in connection and operation. The antenna unit 805 transmits an outbound RF (radio frequency) signal to an obstacle of the plurality of obstacles and receives an inbound RF signal from the obstacle. The control module 815 provides a control signal to the transmitter 810. The transmitter 810 generates the outbound RF signal and the receiver 820 receives the inbound RF signal from the antenna unit 805. In one embodiment, the antenna unit 805 includes one or more transmit antennas coupled to the transmitter 810 and one or more receive antennas coupled to the receiver 820. In an embodiment, the antenna unit 805 is analogous to the antenna unit 300 and thus includes a linear array of antenna and an additional antenna. Each antenna in the linear array of antenna and the additional antenna will have a separate receiver path comprising receiver, mixer and ADC. Each receiver path will be coupled to the digital signal processor 850.

The mixer 825 receives the inbound RF signal from the receiver 820 and generates a demodulated signal. The ADC 830 receives the demodulated signal from the mixer 825 and generates a digital signal in response to the demodulated signal. The FFT module 835 receives the digital signal from the ADC 830 and is configured to transform the digital signal from a time domain to a frequency domain. The DSP 850 is configured to process the digital signal received from the FFT module 835. The signal processing unit 837 estimates an azimuth frequency, an elevation frequency and a range of the obstacle and generates an estimated azimuth frequency, an estimated elevation frequency and an estimated range of the obstacle. The grazing angle detection module 840 estimates a metric from one or more of the estimated azimuth frequency, the estimated elevation frequency and the estimated range of the obstacle. The metric is compared to a threshold to detect an error in at least one of the estimated azimuth frequency and the estimated elevation frequency. In one embodiment, the threshold is a function of signal to noise ratio (SNR) of the signal received at the antenna unit 805. The grazing angle error correction module 845 is coupled to the grazing angle detection module 840 and inverts a sign of at least one of the estimated azimuth frequency and the estimated elevation frequency on error detection. The process of estimating position of the obstacle with the grazing angle detection module 840 and the grazing angle error correction module 845 have been explained in the flowcharts in FIG. 6(*b*), FIG. 6(*c*) and FIG. 6(*d*) and therefore is not included herein for sake of brevity of description.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A radar apparatus for estimating position of an obstacle of a plurality of obstacles comprising:
   a signal processing unit configured to generate an estimated azimuth frequency, an estimated elevation frequency and an estimated range of the obstacle;
   a grazing angle detection module coupled to the signal processing unit and configured to estimate a metric from one or more of the estimated azimuth frequency, the estimated elevation frequency and the estimated range of the obstacle, wherein the metric is compared to a threshold to detect an error in at least one of the estimated azimuth frequency and the estimated elevation frequency; and
   a grazing angle error correction module coupled to the grazing angle detection module and configured to modify at least one of the estimated azimuth frequency and the estimated elevation frequency responsive to error detection.

2. The radar apparatus of claim 1 further comprising an antenna unit coupled to the signal processing unit, wherein the antenna unit further comprising:
   a linear array of antennas; and
   an additional antenna at an offset from at least one antenna in the linear array of antennas, wherein the elevation frequency is estimated from the offset, the estimated azimuth frequency and a phase of a signal received from the obstacle at the additional antenna, to generate the estimated elevation frequency, wherein the offset includes a defined distance of the additional antenna from Z-axis and a defined distance of the additional antenna from X-axis when the linear array of antennas is in one of the Z-axis and X-axis.

3. The radar apparatus of claim 2, wherein spacing is defined between adjacent antennas in the linear array of antennas.

4. The radar apparatus of claim 2, wherein the offset is a multiple of half of an operating wavelength of the antenna unit and the spacing between adjacent antennas in the linear array of antennas is a multiple of half of the operating wavelength of the antenna unit.

5. The radar apparatus of claim 2, wherein the grazing angle detection module is configured to estimate the metric from the estimated azimuth frequency and the estimated elevation frequency, wherein the metric is an estimate of a sine function of an azimuth angle.

6. The radar apparatus of claim 5, wherein the grazing angle error correction module configured to invert a sign of the estimated azimuth frequency to generate a true estimated azimuth frequency when the metric is above the threshold and, wherein the estimated azimuth frequency is the true estimated azimuth frequency when the metric is below the threshold.

7. The radar apparatus of claim 6, wherein the elevation frequency, is configured to be re-estimated from the true estimated azimuth frequency to generate a true estimated elevation frequency and, wherein an elevation angle and the azimuth angle are configured to be estimated from the true estimated azimuth frequency and the true estimated elevation frequency.

8. The radar apparatus of claim 1 further comprising rotating the antenna unit by an angle such that one or more grazing angle ambiguity regions associated with the antenna unit are outside a region of interest.

9. The radar apparatus of claim 8, wherein the grazing angle detection module configured to estimate:
a first difference between the estimated azimuth frequency and an azimuth frequency at each grazing angle ambiguity region of the one or more grazing angle ambiguity regions; and
a second difference between the estimated elevation frequency and an elevation frequency at each grazing angle ambiguity region of the one or more grazing angle ambiguity regions, wherein the metric is estimated from a sum of an absolute value of the first difference and an absolute value of the second difference for each grazing angle ambiguity region.

10. The radar apparatus of claim 9, wherein
the grazing angle error correction module configured to invert a sign of at least one of the estimated azimuth frequency and the estimated elevation frequency to generate the true estimated azimuth frequency and a true estimated elevation frequency respectively, when the metric is below the threshold; and
the estimated azimuth frequency and the estimated elevation frequency are the true estimated azimuth frequency and the true estimated elevation frequency respectively, when the metric is above the threshold.

11. The radar apparatus of claim 10, wherein the elevation angle and the azimuth angle are re-estimated from the true estimated azimuth frequency and the true estimated elevation frequency.

12. A method of estimating position of an obstacle of a plurality of obstacles with a radar apparatus comprising:
generating an estimated azimuth frequency, an estimated elevation frequency and an estimated range of the obstacle in a signal processing unit;
estimating a metric from one or more of the estimated azimuth frequency, the estimated elevation frequency and the estimated range of the obstacle, wherein the metric is compared to a threshold to detect an error in at least one of the estimated azimuth frequency and the estimated elevation frequency; and
modifying on error detection at least one of the estimated azimuth frequency and the estimated elevation frequency to generate a true estimated azimuth frequency and a true estimated elevation frequency respectively.

13. The method of claim 12, wherein the signal processing unit is coupled to an antenna unit, the antenna unit further comprising:
a linear array of antennas; and
an additional antenna at an offset from at least one antenna in the linear array of antennas, wherein the elevation frequency is estimated from the offset, the estimated azimuth frequency and a phase of a signal received from the obstacle at the additional antenna, to generate the estimated elevation frequency, wherein the offset includes a defined distance of the additional antenna from Z-axis and a defined distance of the additional antenna from X-axis when the linear array of antennas is in one of the Z-axis and X-axis.

14. The method of claim 13 further comprising estimating the metric from the estimated azimuth frequency and the estimated elevation frequency, wherein the metric is an estimate of a sine function of an azimuth angle.

15. The method of claim 13 further comprising:
inverting a sign of the estimated azimuth frequency to generate the true estimated azimuth frequency when the metric is above the threshold and, wherein the estimated azimuth frequency is the true estimated azimuth frequency when the metric is below the threshold;
re-estimating the elevation frequency from the true estimated azimuth frequency to generate a true estimated elevation frequency; and
estimating an elevation angle and the azimuth angle from the true estimated azimuth frequency and the true estimated elevation frequency.

16. The method of claim 12 further comprising rotating an antenna unit by an angle such that one or more grazing angle ambiguity regions associated with the antenna unit are outside a region of interest.

17. The method of claim 16 further comprising:
estimating a first difference between the estimated azimuth frequency and an azimuth frequency at each grazing angle ambiguity region of the one or more grazing angle ambiguity regions; and
estimating a second difference between the estimated elevation frequency and an elevation frequency at each grazing angle ambiguity region of the one or more grazing angle ambiguity regions, wherein the metric is estimated from a sum of an absolute value of the first difference and an absolute value of the second difference for each grazing angle ambiguity region.

18. The method of claim 16 further comprising inverting a sign of at least one of the estimated azimuth frequency and the estimated elevation frequency to generate a true estimated azimuth frequency and a true estimated elevation frequency respectively, when the metric is below the threshold, and wherein the estimated azimuth frequency and the estimated elevation frequency are the true estimated azimuth frequency and the true estimated elevation frequency respectively, when the metric is above the threshold.

19. A radar apparatus comprising:
an antenna unit configured to transmit an outbound radio frequency (RF) signal to an obstacle of the plurality of obstacles and receive an inbound RF signal from the obstacle;
a transmitter coupled to the antenna unit and configured to generate the outbound RF signal;

a receiver coupled to the antenna unit and configured to receive the inbound RF signal from the antenna unit, wherein the outbound RF signal is scattered by the obstacle to generate the inbound RF signal;

a mixer coupled to the receiver and to the transmitter and configured to demodulate the inbound RF signal to generate a demodulated signal;

an analog to digital converter (ADC) coupled to the mixer and configured to generate a digital signal in response to the demodulated signal received from the mixer;

an FFT (fast fourier transform) module configured to transform the digital signal from time domain to frequency domain; and a digital signal processor coupled to the FFT module and configured to process the digital signal, the digital signal processor further comprising:

a signal processing unit configured to generate an estimated azimuth frequency, an estimated elevation frequency and an estimated range of the obstacle;

a grazing angle detection module coupled to the signal processing unit and configured to estimate a metric from one or more of the estimated azimuth frequency, the estimated elevation frequency and the estimated range of the obstacle, wherein the metric is compared to a threshold to detect an error in at least one of the estimated azimuth frequency and the estimated elevation frequency; and a grazing angle error correction module coupled to the grazing angle detection module and configured to modify at least one of the estimated azimuth frequency and the estimated elevation frequency responsive to error detection.

20. The radar apparatus of claim 19, wherein the antenna unit further comprising:

a linear array of antennas; and an additional antenna at an offset from at least one antenna in the linear array of antennas, wherein the elevation frequency is estimated from the offset, the estimated azimuth frequency and a phase of a signal received from the obstacle at the additional antenna, to generate the estimated elevation frequency, wherein the offset includes a defined distance of the additional antenna from Z-axis and a defined distance of the additional antenna from X-axis when the linear array of antennas is in one of the Z-axis and X-axis.

21. The radar apparatus of claim 20, wherein the grazing angle detection module configured to estimate the metric from the estimated azimuth frequency and the estimated elevation frequency, wherein the metric is an estimate of a sine function of an azimuth angle.

22. The radar apparatus of claim 20, wherein the grazing angle error correction module configured to invert a sign of the estimated azimuth frequency to generate a true estimated azimuth frequency when the metric is above the threshold and, wherein the estimated azimuth frequency is the true estimated azimuth frequency when the metric is below the threshold.

23. The radar apparatus of claim 20, wherein the elevation frequency is configured to be re-estimated from the true estimated azimuth frequency to generate a true estimated elevation frequency and, wherein an elevation angle and the azimuth angle are configured to be estimated from the true estimated azimuth frequency and the true estimated elevation frequency.

* * * * *